(12) United States Patent
Bang et al.

(10) Patent No.: US 11,531,236 B2
(45) Date of Patent: Dec. 20, 2022

(54) LIQUID CRYSTAL DISPLAY

(71) Applicant: Samsung Display Co., Ltd., Yongin-si (KR)

(72) Inventors: Jung Suk Bang, Hwaseong-si (KR); Kwang Soo Bae, Yongin-si (KR); Min Jeong Oh, Gimpo-si (KR); Bo Ram Lee, Seongnam-si (KR); Young Je Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 160 days.

(21) Appl. No.: 16/134,597

(22) Filed: Sep. 18, 2018

(65) Prior Publication Data

US 2019/0179204 A1   Jun. 13, 2019

(30) Foreign Application Priority Data

Dec. 8, 2017 (KR) .................. 10-2017-0168319

(51) Int. Cl.
*G02F 1/1343* (2006.01)
*G02F 1/1368* (2006.01)
(Continued)

(52) U.S. Cl.
CPC ...... *G02F 1/134309* (2013.01); *G02F 1/1347* (2013.01); *G02F 1/1368* (2013.01); *G02F 1/13471* (2013.01); *G02F 1/133528* (2013.01); *G02F 1/133707* (2013.01); *G02F 1/134336* (2013.01); *G02F 1/136286* (2013.01); *G02F 1/133512* (2013.01); *G02F 1/133514* (2013.01);
(Continued)

(58) Field of Classification Search
CPC ................................. G02F 1/134309
See application file for complete search history.

(56) References Cited

U.S. PATENT DOCUMENTS 9,599,867 B2  3/2017 Kang et al.
10,036,924 B2  7/2018 Tae et al.
(Continued)

FOREIGN PATENT DOCUMENTS

KR 10-2001-0015442  2/2001
KR 10-2015-0132610  11/2015
KR 10-2016-0103603  9/2016

OTHER PUBLICATIONS

Office Action dated Mar. 29, 2022, issued to Korean Patent Application No. 10-2017-0168319 (with English Concise Explanation).

*Primary Examiner* — Edmond C Lau
(74) *Attorney, Agent, or Firm* — H.C. Park & Associates, PLC

(57) ABSTRACT

A liquid crystal display including a first substrate on which a plurality of first pixels are defined, a first pixel electrode arranged for each of the first pixels on the first substrate, a second substrate arranged opposite the first substrate, a third substrate arranged on the second substrate and on which a plurality of second pixels are defined, a second pixel electrode arranged for each of the second pixels on the third substrate, and a fourth substrate arranged opposite the third substrate. Each of the first pixels has a first domain and each of the second pixels has a second domain, and a direction of the first domain of the first pixels and a direction of the second domain of the second pixels are different from each other.

19 Claims, 17 Drawing Sheets

(51) Int. Cl.
*G02F 1/1347* (2006.01)
*G02F 1/1362* (2006.01)
*G02F 1/1335* (2006.01)
*G02F 1/1337* (2006.01)

(52) U.S. Cl.
CPC .. *G02F 1/133548* (2021.01); *G02F 1/136227* (2013.01); *G02F 2201/122* (2013.01); *G02F 2201/123* (2013.01)

(56) References Cited

U.S. PATENT DOCUMENTS

| | | | |
|---|---|---|---|
| 2012/0062527 A1* | 3/2012 | Cheong | G02F 1/1347 345/204 |
| 2015/0331266 A1* | 11/2015 | Kang | G02F 1/13624 257/59 |
| 2018/0164622 A1* | 6/2018 | Ono | G02F 1/1395 |
| 2018/0341132 A1* | 11/2018 | Suzuki | G02F 1/1347 |

\* cited by examiner

LIQUID CRYSTAL DISPLAY

CROSS REFERENCE TO RELATED APPLICATION

This application claims priority from and the benefit of Korean Patent Application No. 10-2017-0168319, filed on Dec. 8, 2017, which is hereby incorporated by reference for all purposes as if fully set forth herein.

BACKGROUND

Field

Exemplary embodiments of the invention relate generally to a liquid crystal display.

Discussion of the Background

Liquid crystal displays (LCDs) include two substrates on which electric field generating electrodes, such as pixel electrodes, common electrodes, and the like, are formed. LCDs include a liquid crystal layer introduced between the two substrates, and display images by applying a voltage to the electric field generating electrodes to form an electric field in the liquid crystal layer, thereby determining an alignment of liquid crystals included in the liquid crystal layer and controlling polarization of incident light emitted from a backlight unit.

Among such LCDs, a vertical alignment mode LCD, in which long axes of liquid crystals are arranged vertically with respect to upper and lower substrates in a state in which an electric field is not applied thereto, is being developed.

Meanwhile, there have been attempts to improve the contrast ratio of LCDs by controlling transmittance of light using two liquid crystal layers. However, in this case, in comparison to an LCD using only one liquid crystal layer, it may be disadvantageous from a viewpoint of overall transmittance.

Further, in a vertical alignment mode LCD, brightness thereof may be visually recognized differently according to a viewing direction of the LCD.

The above information disclosed in this Background section is only for understanding of the background of the inventive concepts, and, therefore, it may contain information that does not constitute prior art.

SUMMARY

Exemplary embodiments of the invention provide an LCD having good transmittance even when two liquid crystal layers are used and in which a brightness deviation according to a viewing direction thereof is minimized.

Additional features of the inventive concepts will be set forth in the description which follows, and in part will be apparent from the description, or may be learned by practice of the inventive concepts.

An exemplary embodiment of the invention provides a liquid crystal display (LCD) including a first substrate on which a plurality of first pixels are defined, a first pixel electrode arranged for each of the first pixels on the first substrate, a second substrate arranged opposite the first substrate, a third substrate arranged on the second substrate and on which a plurality of second pixels are defined, a second pixel electrode arranged for each of the second pixels on the third substrate, and a fourth substrate arranged opposite the third substrate. Each of the first pixels has a first domain and each of the second pixels has a second domain, and a direction of the first domain of the first pixels and a direction of the second domain of the second pixels are different from each other.

Another exemplary embodiment of the invention also provides an LCD including a first substrate on which a plurality of first pixels are defined, a first pixel electrode arranged for each of the first pixels on the first substrate, a second substrate arranged opposite the first substrate and on which a plurality of second pixels are defined on one surface opposite a direction in which the first substrate is arranged, a second pixel electrode arranged for each of the second pixels on the second substrate, and a third substrate arranged opposite the second substrate. Each of the first pixels has a first domain and each of the second pixels has a second domain, and a direction of the first domain of the first pixels and a direction of the second domain of the second pixels are different from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1:
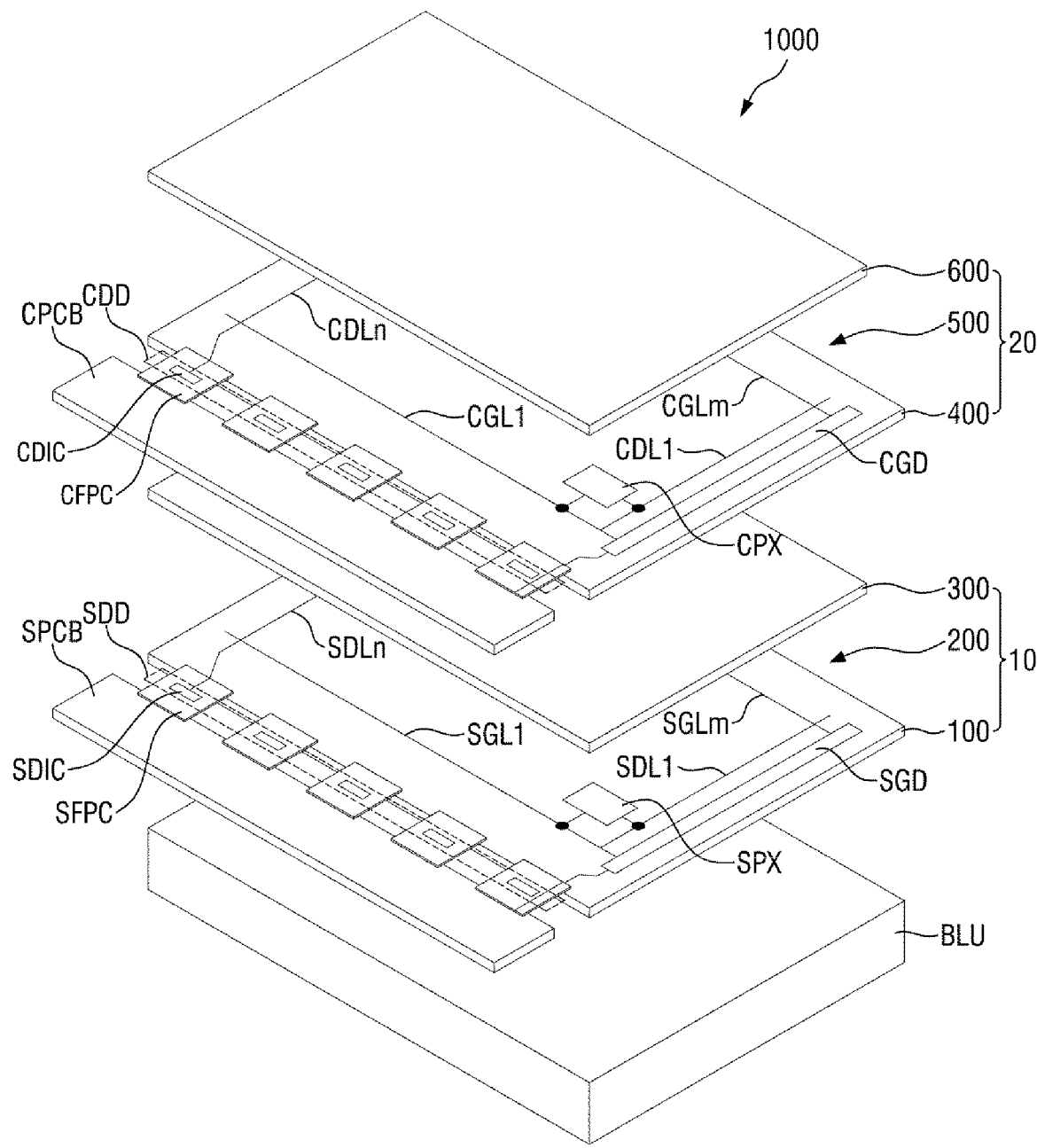
FIG. 1 is a perspective view of a liquid crystal display (LCD) according to an exemplary embodiment.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of a liquid crystal display (LCD) according to an exemplary embodiment.

Referring to FIG. 1, an LCD 1000 according to an exemplary embodiment includes a first display panel 10, a second display panel 20, a first printed circuit board SPCB, a second printed circuit board CPCB, and a backlight unit BLU. The first display panel 10, the second display panel 20, and the backlight unit BLU may have a rectangular shape having long sides in a first direction DR1, and short sides in a second direction DR2 which intersects the first direction DR1.

The backlight unit BLU generates light and provides the generated light to the first display panel 10. The first display panel 10 generates an image using the light provided from the backlight unit BLU and outputs light for providing an image.

The backlight unit BLU may be an edge type backlight unit or a direct type backlight unit.

Each of the first display panel 10 and the second display panel 20 may control transmittance of the light provided from the backlight unit BLU. For example, when both of the first display panel 10 and the second display panel 20 control light so as not to transmit, a user may view a black image, and when both of the first display panel 10 and the second display panel 20 control light so as to transmit, the user may view a white image. In the present exemplary embodiment, since the transmittance levels of the first display panel 10 and the second display panel 20 are respectively controlled, the black image may be close to full black. That is, a contrast ratio may be excellent.

Meanwhile, structures of the first display panel 10 and the second display panel 20 may be similar. More particularly, the first display panel 10 and the second display panel 20 may have substantially the same structure, except that the first display panel 10 does not include a color conversion layer which will be described below, the second display panel 20 includes a color conversion layer, and some structures of electrodes for controlling light are different.

Hereinafter, the first display panel 10 will be mainly described and the second display panel 20 will be mainly described based on differences from the description of the first display panel 10.

First, the first display panel 10 includes a first display substrate 100, a second display substrate 300 facing the first display substrate 100, and a first liquid crystal layer 200 arranged between the first display substrate 100 and the second display substrate 300. A plurality of first pixels SPX, a plurality of first gate lines SGL1 to SGLm, and a plurality of first data lines SDL1 to SDLn are arranged on the first display substrate 100. Here, m and n are natural numbers. For convenience of description, although only one first pixel SPX is illustrated in FIG. 1, a plurality of first pixels SPX may be substantially defined on the first display substrate 100.

The first gate lines SGL1 to SGLm and the first data lines SDL1 to SDLn are arranged to be insulated from each other and to intersect each other. The first gate lines SGL1 to SGLm extend in the first direction DR1 and are connected to a first gate driver SGD. The first data lines SDL1 to SDLn extend in the second direction DR2 and are connected to a first data driver SDD.

The first pixels SPX are arranged to be electrically connected to the first gate lines SGL1 to SGLm and the first data lines SDL1 to SDLn, which intersect each other. The first pixels SPX may be arranged in a matrix form but the inventive concepts are not limited thereto.

The first gate driver SGD is arranged in a predetermined region adjacent to at least one short side among short sides of the first display substrate 100. The first gate driver SGD may be formed simultaneously during a manufacturing process of transistors of the first pixels SPX and may be mounted on the first display substrate 100 in the form of an amorphous silicon thin film transistor (TFT) gate driver circuit (ASG) or an oxide silicon TFT gate driver circuit (OSG).

However, the inventive concepts are not limited thereto, and the first gate driver SGD may include a plurality of driving chips be mounted on a flexible printed circuit board and be connected to the first display substrate 100 by a tape carrier package (TCP) method. Alternatively, the first gate driver SGD may include a plurality of driving chips and be mounted on the first display substrate 100 by a chip-on-glass (COG) method.

The first data driver SDD includes a plurality of first source driving chips SDIC. The first source driving chips SDIC are respectively mounted on first flexible printed circuit boards SFPC and are connected to the first printed circuit board SPCB and a predetermined region adjacent to at least one long side among long sides of the first display substrate 100. That is, the first data driver SDD is connected to the first display substrate 100 and the first printed circuit board SPCB by a TCP method. However, the inventive concepts are not limited thereto, and the first source driving chips SDIC of the first data driver SDD may be mounted on the first display substrate 100 by a COG method.

A timing controller (not illustrated) is arranged on the first printed circuit board SPCB. The timing controller may be mounted on the first printed circuit board SPCB in the form of an integrated circuit chip and connected to the first gate driver SGD and the first data driver SDD. The timing controller outputs a first gate control signal, a first data control signal, and pieces of image data. However, the timing controller may be arranged on a third display substrate 400 to control both the first display panel 10 and the second display panel 20.

The first gate driver SGD receives the first gate control signal from the timing controller. The first gate driver SGD may generate first gate signals in response to the first gate control signal and may sequentially output the generated first gate signals. The first gate signals are provided to the first pixels SPX in units of rows through the first gate lines SGL1 to SGLm. As a result, the first pixels SPX may be driven in units of rows.

The first data driver SDD receives the pieces of image data and the first data control signal from the timing controller. The first data driver SDD generates and outputs first analog data voltages corresponding to the pieces of image data in response to the first data control signal. The first data voltages are provided to the first pixels SPX through the first data lines SDL1 to SDLn.

The first pixels SPX receive the first data voltages through the first data lines SDL1 to SDLn in response to the first gate signals provided through the first gate lines SGL1 to SGLm. The first pixels SPX display gradations corresponding to the first data voltages so that transmittance levels of regions in which the first pixels SPX are arranged in the first display substrate 100, the first liquid crystal layer 200, and the second display substrate 300 may be controlled.

The second display panel 20 is arranged on the first display panel 10.

The second display panel 20 includes the third display substrate 400, a fourth display substrate 600 facing the third display substrate 400, and a second liquid crystal layer 500 arranged between the third display substrate 400 and the fourth display substrate 600.

A plurality of second pixels CPX, a plurality of second gate lines CGL1 to CGLm, and a plurality of second data lines CDL1 to CDLn are arranged on the third display substrate 400.

The second pixels CPX are arranged to be electrically connected to the second gate lines CGL1 to CGLm and the second data lines CDL1 to CDLn which intersect each other.

The second pixels CPX may be arranged in a matrix form, but the inventive concepts are not limited thereto. The second pixels CPX may be arranged to respectively correspond to the first pixels SPX of the first display panel 10 arranged therebelow. Here, the term "correspond to" may mean that the first pixel SPX and the corresponding second pixel CPX are arranged to substantially overlap each other.

Meanwhile, although a structure in which the first pixels SPX correspond one-to-one with the second pixels CPX is described in the present embodiment, the inventive concepts are not limited thereto. That is, one first pixel SPX may be arranged to correspond to multiple second pixels CPX in order to adjust the transmittance level.

A second gate driver CGD is arranged in a predetermined region adjacent to at least one short side among short sides of the third display substrate 400 in a similar manner to the first gate driver SGD.

The second data driver CDD includes a plurality of second source driving chips CDIC. The second source driving chips CDIC are respectively mounted on second flexible printed circuit boards CFPC and are connected to the second printed circuit board CPCB and a predetermined region adjacent to any one long side among long sides of the third display substrate 400.

The second gate driver CGD receives the second gate control signal, and provides second gate signals to the second gate lines CGL1 to CGLm to drive the second pixels CPX.

The second data driver CDD receives the pieces of image data and a second data control signal from the timing controller, and provides second data voltages to the second data lines CDL1 to CDLn to drive the second pixels CPX.

The second pixels CPX receive the second data voltages through the second data lines CDL1 to CDLn in response to the second gate signals provided through the second gate lines CGL1 to CGLm. The second pixels CPX display gradations corresponding to the second data voltages and transmittances may be controlled in regions in which the second pixels CPX are arranged in the third display substrate 400, the second liquid crystal layer 500, and the fourth display substrate 600.

Meanwhile, although not illustrated, a first polarization layer (not illustrated) may be arranged between the backlight unit BLU and the first display panel 10, a second polarization layer (not illustrated) may be arranged between the first display panel 10 and the second display panel 20, and a third polarization layer (not illustrated) may be arranged on the second display panel 20. Each of the first to third polarization layers may control polarization of the light provided from the backlight unit BLU so that transmittance of light passing through the first display panel 10 and the second display panel 20 is smoothly controlled.

Hereinafter, a specific structure of one first pixel SPX and a corresponding second pixel CPX will be described.

Figure 2:
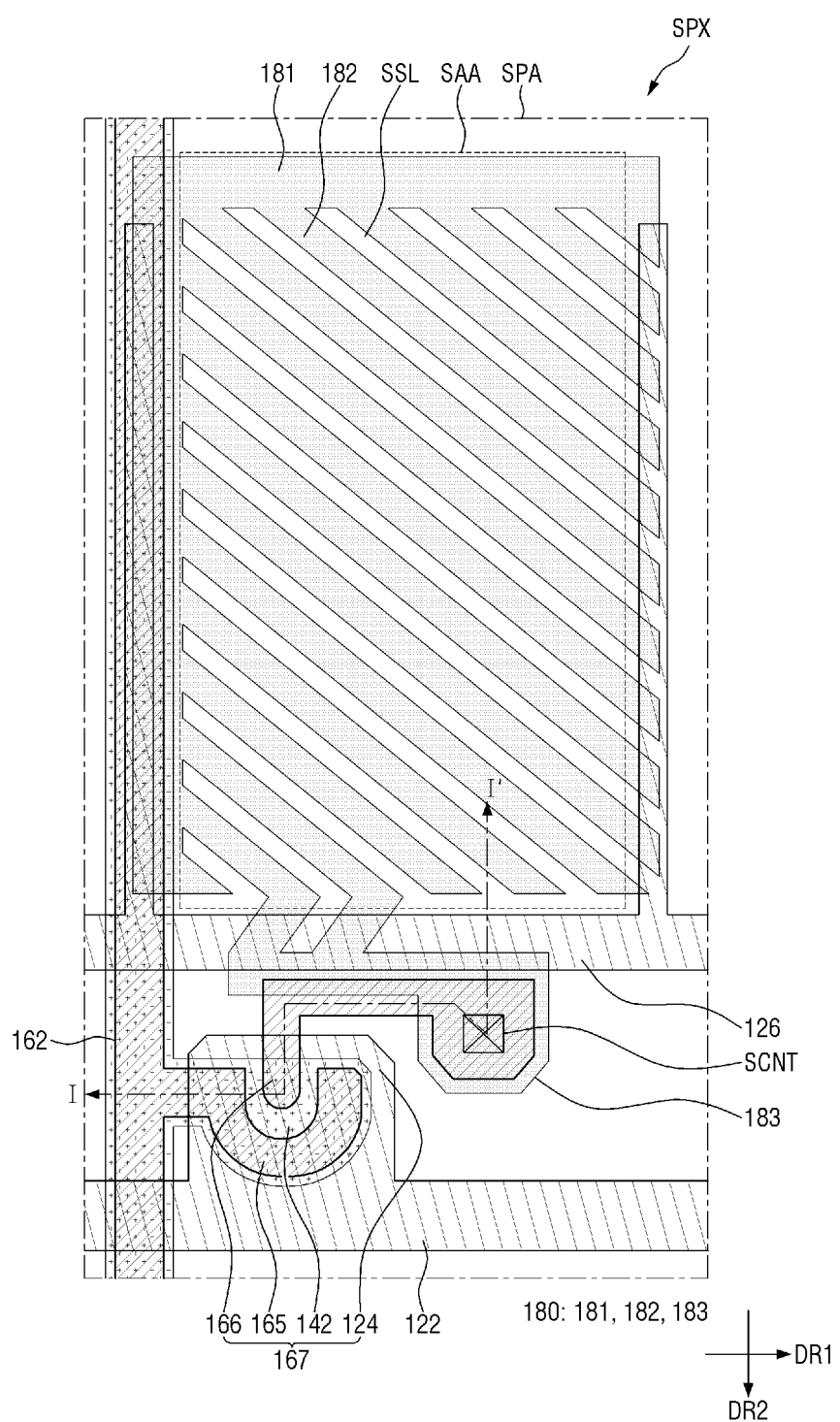
FIG. 2 is a schematic layout diagram of a first pixel illustrated in FIG. 1.
Figure 3:
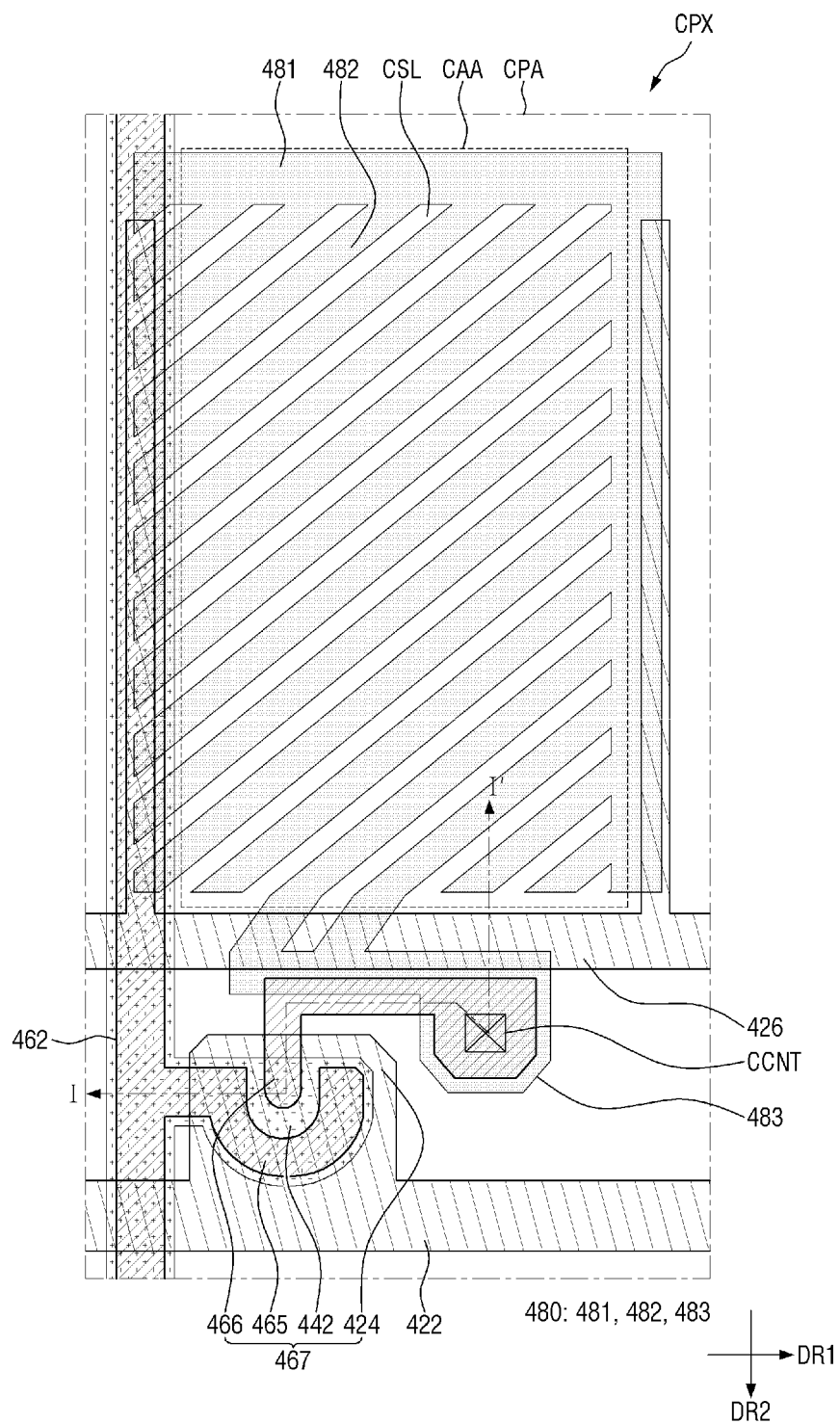
FIG. 3 is a schematic layout diagram of a second pixel corresponding to the first pixel illustrated in FIG. 2.
Figure 4:
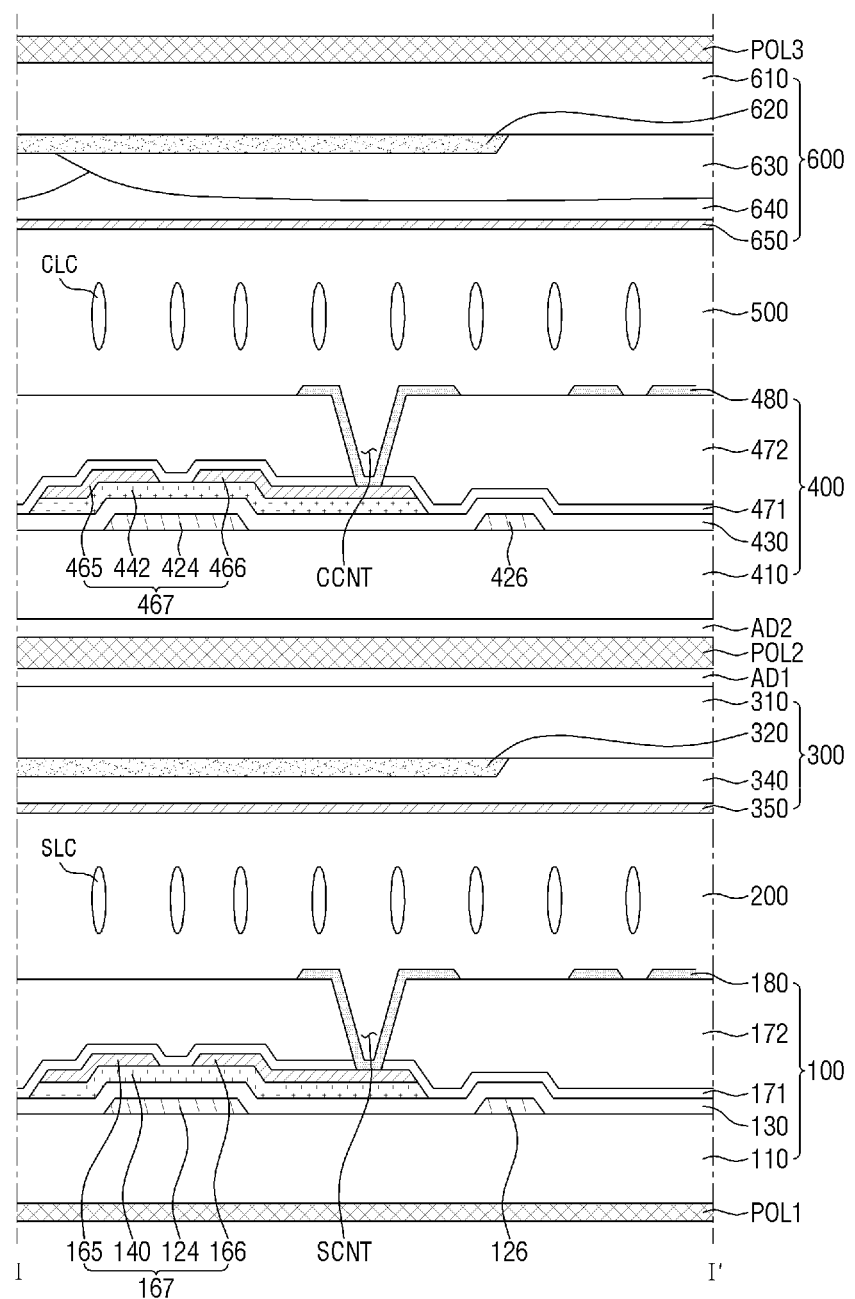
FIG. 4 is a cross-sectional view taken along line IV-IV' illustrated in FIGS. 2 and 3.

FIG. 2 is a schematic layout diagram of the first pixel illustrated in FIG. 1, FIG. 3 is a schematic layout diagram of the second pixel corresponding to the first pixel illustrated in FIG. 2, and FIG. 4 is a cross-sectional view taken along line IV-IV' illustrated in FIGS. 2 and 3.

FIG. 2 illustrates a layout of a first pixel region SPA, which is a region in which one first pixel SPX is arranged and which is defined in the first display panel 10. Further, FIG. 3 illustrates a layout of a second pixel region CPA, which is a region in which the second pixel CPX corresponding to the first pixel SPX illustrated in FIG. 2 is arranged and which is defined in the second display panel 20. Here, the first pixel region SPA and the second pixel region CPA may be arranged to overlap each other.

The first pixel region SPA includes a first active region SAA, which is a region in which the light provided from the backlight unit BLU is controlled so as to pass through the first display panel 10 and to be output to the second display panel 20. Further, the second pixel region CPA includes a second active region CAA, which is a region in which the light provided from the first display panel 10 is controlled so as to pass through the second display panel 20 and to be output to the user. The first active region SAA and the second active region CAA may be arranged to overlap each other.

Referring to FIGS. 2 to 4, the LCD 1000 according to an exemplary embodiment includes a first polarization layer POL1, the first display panel 10, a second polarization layer POL2, the second display panel 20, and a third polarization layer POL3.

The first polarization layer POL1 is arranged below the first display panel 10. Here, the expression "below the first display panel 10" may mean "on a lower portion of the first display panel 10" in view of FIG. 4. The second polarization layer POL2 is arranged between the first display panel 10 and the second display panel 20. The third polarization layer POL3 is arranged on an upper portion of the second display panel 20.

As described above, each of the first to third polarization layers POL1, POL2, and POL3 may control the polarization of the light provided from the backlight unit BLU so that the transmittance level of the light passing through the first display panel 10 and the second display panel 20 is smoothly controlled.

A switching element for changing an arrangement of first liquid crystals SLC included in the first liquid crystal layer 200, for example, a thin film transistor 167, is arranged on the first display substrate 100. The second display substrate 300 is a substrate arranged opposite the first display substrate 100.

The first liquid crystal layer 200 may be interposed between the first display substrate 100 and the second display substrate 300 and may include the plurality of first liquid crystals SLC having dielectric anisotropy. When an electric field is applied between the first display substrate 100 and the second display substrate 300, the first liquid crystals SLC are rotated between the first display substrate 100 and the second display substrate 300 in a specific direction so that light may be transmitted or blocked. Here, the expression "the first liquid crystals SLC are rotated" may mean not only that the first liquid crystals SLC are actually rotated but also that the arrangement of the first liquid crystals SLC is changed by the electric field. The above descriptions of the first liquid crystal layer 200 and the first liquid crystals SLC may be applied to the second liquid crystal layer 500 and second liquid crystals CLC included in the second liquid crystal layer 500.

Hereinafter, the first display substrate 100 will be described.

The first display substrate 100 includes a first base substrate 110. The first base substrate 110 may be a transparent insulating substrate. For example, the first base substrate 110 may be formed of a glass substrate, a quartz substrate, a transparent resin substrate, or the like.

In some exemplary embodiments, the first base substrate 110 may be curved in one direction. In some other exemplary embodiments, the first base substrate 110 may have flexibility. That is, the first base substrate 110 may be deformed by rolling, folding, bending, or the like.

A first gate line 122, a first gate electrode 124, and a first maintaining line 126 are arranged on the first base substrate 110.

The first gate line 122 transmits the first gate signal for controlling the first thin film transistor 167 to be described below. The first gate line 122 may have a shape extending in the first direction DR1. Turn-on and turn-off of the first thin film transistor 167 may be controlled to correspond to a voltage level of the first gate signal.

The first gate electrode 124 may be formed to have a shape protruding from the first gate line 122 and may be physically connected to the first gate line 122. The first gate electrode 124 may be one component constituting the first thin film transistor 167.

The first maintaining line 126 is arranged so as not to overlap each first gate line 122. The first maintaining line 126 generally extends in the second direction DR2, and a portion of it may extend in the first direction DR1 when extending along an edge of the first active region SAA. The first maintaining line 126 may be arranged to be adjacent to or to partially overlap an edge of a first pixel electrode 180 to be described below, and a predetermined capacitance may be formed between the first pixel electrode 180 and the first maintaining line 126. Accordingly, a rapid drop in a level of a voltage provided to the first pixel electrode 180 may be prevented. However, when a degree of the drop in the level of the voltage provided to the first pixel electrode 180 does not adversely affect display quality or is manageable without the first maintaining line 126, the first maintaining line 126 may be omitted.

The first gate line 122, the first gate electrode 124, and the first maintaining line 126 may be made of the same material. For example, the first gate line 122, the first gate electrode 124, and the first maintaining line 126 may include an aluminum-based metal, such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), or the like. The first gate line 122, the first gate electrode 124, and the first maintaining line 126 may have a single-layer structure or a multi-layer structure including at least two conductive films having different physical properties.

A first gate insulating layer 130 is arranged on the first gate line 122, the first gate electrode 124, and the first maintaining line 126. The first gate insulating layer 130 may be made of an insulating material and, for example, may be made of silicon nitride, silicon oxide, or the like. The first gate insulating layer 130 may have a single-layer structure or may have a multi-layer structure including at least two insulating films having different physical properties.

A first semiconductor pattern 142 is arranged on the first gate insulating layer 130. At least a portion of the first semiconductor pattern 142 may overlap the first gate electrode 124. A channel for electrically connecting a first source electrode 165 and a first drain electrode 166, which will be described below, may be formed in the first semiconductor pattern 142.

Although not illustrated in the drawings, resistive contact members may be further arranged on the first semiconductor pattern 142 in some exemplary embodiments. The resistive contact members may be formed of n+ hydrogenated amorphous silicon doped with an n-type impurity having a high concentration, or formed of silicide. The resistive contact members may be arranged on the first semiconductor pattern 142 in pairs. The resistive contact members may allow a contact between the first source electrode 165 and the first semiconductor pattern 142 and a contact between the first drain electrode 166 and the first semiconductor pattern 142 to have ohmic contact characteristics. When the first semiconductor pattern 142 includes oxide semiconductors, the resistive contact members may be omitted.

Meanwhile, a first data line 162, the first source electrode 165, and the first semiconductor pattern 142 may be manufactured using the same mask process. Accordingly, the first semiconductor pattern 142 may further include a region arranged to overlap the first data line 162 and the first source electrode 165.

The first semiconductor pattern 142 may be formed of amorphous silicon, polycrystalline silicon, or an oxide semiconductor.

The first data line 162, the first source electrode 165, and the first drain electrode 166 are arranged on the first semiconductor pattern 142 and the first gate insulating layer 130.

The first data line 162 may extend in the second direction DR2 and intersect the first gate line 122. The first data line 162 described in the present exemplary embodiment may correspond to any one of the first data lines SDL1 to SDLn illustrated in FIG. 1.

The first data line 162 may be insulated from the first gate line 122 and the first gate electrode 124 by the first gate insulating layer 130.

The first data line 162 may provide a first data signal to the first source electrode 165. A gradation of the first pixel SPX may be changed to correspond to a voltage level of the first data signal.

The first source electrode 165 may branch from the first data line 162 so that at least a portion thereof may overlap the first gate electrode 124.

As illustrated in FIG. 2, the first source electrode 165 may be spaced a predetermined distance from the first drain electrode 166 and may have a U-shape which surrounds the first drain electrode 166. However, the inventive concepts are not limited thereto, and the first source electrode 165 and the first drain electrode 166 may have a rod shape in which the first source electrode 165 and the first drain electrode 166 are spaced a predetermined distance from each other in parallel. That is, the first source electrode 165 and the first drain electrode 166 may be designed to have a free shape when a section in which the first source electrode 165 and the first drain electrode 166 oppose each other from a predetermined distance is secured.

The first data line 162, the first source electrode 165, and the first drain electrode 166 may be made of the same material. For example, the first data line 162, the first source electrode 165, and the first drain electrode 166 may be formed of aluminum, copper, silver, molybdenum, chromium, titanium, tantalum, or an alloy thereof. Further, the first data lines 162, the first source electrode 165, and the first drain electrode 166 may have a multi-layer structure in which a lower film (not illustrated) such as a refractory metal and a low-resistance upper film (not illustrated) formed on the lower film are formed, but the inventive concepts are not limited thereto.

The first gate electrode 124, the first semiconductor pattern 142, the first source electrode 165, and the first drain electrode 166 may constitute the first thin film transistor 167, which is a switching element.

A first passivation layer 171 is arranged on the first gate insulating layer 130 and the first thin film transistor 167. The first passivation layer 171 may be made of an inorganic insulating material and may be arranged to cover the first thin film transistor 167. The first passivation layer 171 may protect the first thin film transistor 167. In some exemplary embodiments, the first passivation layer 171 may be omitted.

A first planarization layer 172 is arranged on the first passivation layer 171. The first planarization layer 172 may be made of an insulating material, and for example, may be an organic film made of an organic material. The first planarization layer 172 may planarize a localized step structure caused by components arranged between the first planarization layer 172 and the first base substrate 110. In other words, an upper surface of the first planarization layer 172 may be substantially planarized. However, in some exemplary embodiments, the first planarization layer 172 may be omitted.

A first contact hole SCNT may be formed in the first passivation layer 171 and the first planarization layer 172 to expose, upward in a direction perpendicular to an upper surface of the first base substrate 110, a portion of the first thin film transistor 167, and more particularly, a portion of the first drain electrode 166. The first contact hole SCNT may be formed to have a shape passing through the first passivation layer 171 and the first planarization layer 172.

The first pixel electrode 180 is arranged on the first planarization layer 172. The first pixel electrode 180 may be physically connected to the first drain electrode 166 through the first contact hole SCNT and may receive the first data voltage from the first drain electrode 166.

The first pixel electrode 180 may be made of a transparent conductive material, such as indium tin oxide (ITO), indium zinc oxide (IZO), indium tin zinc oxide (ITZO), Al-doped zinc oxide (AZO), or the like.

The first pixel electrode 180 may generally be arranged in the first active region SAA but may include a region expanding to overlap the first contact hole SCNT for connection to the first drain electrode 166.

For example, the first pixel electrode 180 may include a first stem electrode 181, first branch electrodes 182, and a first extension electrode 183. In this case, first slits SSL, which are openings in which there is no transparent conductive material, may be arranged between the first branch electrodes 182 which oppose each other. A regular pattern may be formed on the first pixel electrode 180 by the first slits SSL, and a direction and degree of inclination of the first liquid crystals SLC arranged to overlap the first pixel electrode 180 may be controlled according to a shape and pattern of the first pixel electrode 180.

Each of components constituting the first pixel electrode 180 may be arranged in the first active region SAA. However, as an exception, the first extension electrode 183 may be arranged outside the first active region SAA as described above.

The first stem electrode 181 may include both of a section extending in the first direction DR1 and a section extending in the second direction DR2. In the present exemplary embodiment, the first stem electrode 181 is illustrated as having a structure extending along the edge of the first active region SAA. Generally, since the first liquid crystals SLC are inclined toward a direction in which the first stem electrode 181 is arranged, a collision between the first liquid crystals SLC may occur in the first stem electrode 181, and a texture may be generated. Accordingly, the first stem electrode 181 is arranged so as to extend along the edge of the first active region SAA without crossing a central portion of the first active region SAA and thus, reduction of transmittance by the first stem electrode 181 may be minimized.

Further, a section of the first stem electrode 181, and more particularly, a section extending in the same direction as the direction in which the first data line 162 extends, may be arranged to overlap the first data line 162 and thus, reduction of transmittance may be minimized. In the present exemplary embodiment, a section of the first stem electrode 181 extending in the second direction DR2 may be arranged to overlap the first data line 162 and thus, the reduction of transmittance by the first stem electrode 181 may be minimized.

The plurality of first branch electrodes 182 may respectively extend in directions inclined in both the first direction DR1 and the second direction DR2 from the first stem electrode, that is, in directions which are not all parallel to the first direction DR1 and the second direction DR2.

Specifically, the respective first branch electrodes 182 may extend in the same direction. In the present exemplary embodiment, a structure in which the first branch electrodes 182 extend in a direction toward a lower right end in the view of FIG. 2 is illustrated. When the first branch electrodes 182 are formed to extend in the same direction, the first slits SSL formed between the first branch electrodes 182 are also formed to extend in one direction. Since the first branch electrodes 182 are arranged over most of the first active region SAA, the first liquid crystals SLC in the first active region SAA may be inclined in the same direction. In the present exemplary embodiment, the liquid crystals arranged in the first active region SAA are substantially parallel to the extending direction of the first branch electrodes 182, and may be inclined in a direction of a direction in which the first stem electrode 181 is arranged, that is, in a direction toward an upper left end in the view of FIG. 2.

Here, that the first branch electrodes 182 extend in the same direction is defined as meaning that the first branch electrodes 182, which are arranged in a region of 80% or more of a region in which the first branch electrodes 182 are arranged in the first active region SAA, extend in the same direction. Specifically, when the first branch electrodes 182 extend in the same direction, the corresponding first pixels SPX may be defined as having one domain. That is, even though directions in which some of the first branch electrodes 182 extend, for example, directions in which the first branch electrodes 182 extend in a region of less than 20% of the region in which the first branch electrodes 182 are arranged, are different, when directions in which the first branch electrodes 182 arranged in a remaining region of 80% of the region extend are the same, it may means that the first branch electrodes 182 arranged in the corresponding first pixel region SPA extend in the same direction and the corresponding first pixels SPX have one domain. Here, a direction of the domain may be defined as a direction in which the first liquid crystals SLC arranged in the corresponding first pixels SPX are controlled so as to be inclined. In other words, in the present exemplary embodiment, a direction of a domain of the first pixels SPX may be a direction toward the upper left end in the view of FIG. 2.

Since the first liquid crystals SLC are controlled so as to be inclined in one direction over most of the first active region SAA when the corresponding first pixels SPX have one domain, collision between the first liquid crystals SLC may be minimized and occurrence of a texture may be minimized. Thus, transmittance of the corresponding first pixels SPX may be improved, and transmittance of the first display panel 10 may be improved.

The first extension electrode 183 is arranged to protrude toward an outside of the first active region SAA. The first extension electrode 183 may be connected to the first stem electrode 181 or the first branch electrodes 182 and may be formed to overlap the first contact hole SCNT. The first extension electrode 183 may be physically connected to the first drain electrode 166 through the first contact hole SCNT and may receive the first data voltage. The first data voltage provided to the first extension electrode 183 may be transmitted to the first stem electrode 181 and the first branch electrodes 182 through the first extension electrode 183.

Meanwhile, a first lower alignment film (not illustrated) may be further arranged on the first pixel electrode 180. The first lower alignment film may control an initial alignment angle of the first liquid crystals SLC included in the first liquid crystal layer 200. In some exemplary embodiments, the first lower alignment film may be omitted.

Hereinafter, the second display substrate 300 will be described.

The second display substrate 300 includes a second base substrate 310, a first light shielding member 320, a first overcoating layer 340, and a first common electrode 350.

The second base substrate 310 is arranged opposite the first base substrate 110. The second base substrate 310 may be a transparent insulating substrate. For example, the second base substrate 310 may be formed of a glass substrate, a quartz substrate, a transparent resin substrate, or the like. The second base substrate 310 may have a flat plate shape, but may be curved in a specific direction.

The first light shielding member 320 is arranged on one surface of the second base substrate 310 facing the first display substrate 100. The first light shielding member 320 may be arranged to overlap the first gate line 122, the first data line 162, the first thin film transistor 167, and the first contact hole SCNT, that is, to overlap a region other than the first active region SAA, and may block transmission of light in the region other than the first active region SAA.

The first overcoating layer 340 is arranged on one surface of the first light shielding member 320 facing the first display substrate 100. The first overcoating layer 340 may reduce a step structure caused by the first light shielding member 320. In some exemplary embodiments, the first overcoating layer 340 may be omitted.

The first common electrode 350 is arranged on one surface of the first overcoating layer 340 facing the first display substrate 100.

The first common electrode 350 may be made of a transparent conductive material such as ITO, IZO, ITZO, AZO, or the like.

The first common electrode 350 may be formed over the entire surface of the second base substrate 310 as a single plate body. A first common voltage may be applied to the first common electrode 350 and the first common electrode 350 may form an electric field in the first liquid crystal layer 200 along with the first pixel electrode 180.

Here, a difference between the first common voltage and the first data voltage may be controlled. Accordingly, an electric field for controlling a gradient of the first liquid crystal SLC may be formed in a space between the first pixel electrode 180 and the first common electrode 350, which are arranged to overlap each other.

Meanwhile, a first upper alignment film (not illustrated) may be further arranged on one surface of the first common electrode 350 facing the first display substrate 100. The first upper alignment film may control the initial alignment angle of the first liquid crystals SLC included in the first liquid crystal layer 200. In some exemplary embodiments, the first upper alignment film may be omitted.

Hereinafter, the first liquid crystal layer 200 will be described.

The first liquid crystal layer 200 includes the plurality of first liquid crystals SLC having dielectric anisotropy and refractive index anisotropy. The first liquid crystals SLC may be arranged in a direction perpendicular to the first display substrate 100 and the second display substrate 300 in a state in which no electric field is formed in the first liquid crystal layer 200. When an electric field is formed between the first display substrate 100 and the second display substrate 300, the first liquid crystals SLC may be rotated or inclined between the first display substrate 100 and the second display substrate 300 in a specific direction and thus, polarization of light may be changed.

The first display substrate 100, the first liquid crystal layer 200, and the second display substrate 300 which are described above may constitute the first display panel 10.

A first adhesive layer AD1 is arranged on the first display panel 10, that is, on the second display substrate 300. The second polarization layer POL2 is arranged on the first adhesive layer AD1. A second adhesive layer AD2 is arranged on the second polarization layer POL2. Further, a third base substrate 410 is arranged on the second adhesive layer AD2.

The first adhesive layer AD1 and the second adhesive layer AD2 may serve to adhere and fix components arranged on both upper and lower surfaces of each of the first adhesive layer AD1 and the second adhesive layer AD2. Accordingly, the first display panel 10 and the second display panel 20 may be integrally fixed and the second polarization layer POL2 may be further arranged therebetween.

Hereinafter, the second display panel 20 will be described. However, a structure of second display panel 20 is substantially the same as the structure of the first display panel 10, except for whether an electrode for generating an electric field and a color conversion layer are included, and description of configurations having an identical structure will be omitted or simplified.

The third display substrate 400 is arranged on the second adhesive layer AD2. Hereinafter, the third display substrate 400 will be described.

The third display substrate 400 includes the third base substrate 410.

A second gate line 422, a second gate electrode 424, and a second maintaining line 426 are arranged on the third base substrate 410.

A second gate insulating layer 430 is arranged on the second gate line 422, the second gate electrode 424, and the second maintaining line 426.

A second semiconductor pattern 442 is arranged on the second gate insulating layer 430.

A second data line 462, a second source electrode 465, and a second drain electrode 466 are arranged on the second semiconductor pattern 442 and the second gate insulating layer 430. The second source electrode 465, the second drain electrode 466, the second semiconductor pattern 442, and the second gate electrode 424 may constitute a second thin film transistor 467, which is a switching element.

A second passivation layer 471 is arranged on the second gate insulating layer 430 and the second thin film transistor 467. The second passivation layer 471 may be made of an inorganic insulating material and may be arranged to cover the second thin film transistor 467. The second passivation layer 471 may protect the second thin film transistor 467. In some exemplary embodiments, the second passivation layer 471 may be omitted.

A second planarization layer 472 is arranged on the second passivation layer 471. A second contact hole CCNT may be arranged in the second passivation layer 471 and the second planarization layer 472.

A second pixel electrode 480 is arranged on the second planarization layer 472.

The second pixel electrode 480 includes a second stem electrode 481, second branch electrodes 482, and a second extension electrode 483. Further, second slits CSL, which are openings in which there is no transparent conductive material, may be arranged between the second branch electrodes 482 facing each other. A regular pattern may be formed on the second pixel electrode 480 by the second slits CSL, and a direction and degree of inclination of the second liquid crystals CLC arranged to overlap the second pixel electrode 480 may be controlled according to a shape and pattern of the second pixel electrode 480.

Each component constituting the second pixel electrode 480 may be arranged in the second active region CAA. However, as an exception, the second extension electrode 483 may be arranged outside the second active region CAA, as described above.

The second stem electrode 481 may include both a section extending in the first direction DR1 and a section extending in the second direction DR2. In the present embodiment, the second stem electrode 481 is illustrated as having a structure extending along an edge of the second active region CAA. Generally, since the second liquid crystals CLC are inclined in a direction in which the second stem electrode 481 is arranged, a collision between the second liquid crystals CLC may occur in the second stem electrode 481 and a texture may be generated. Accordingly, the second stem electrode 481 is arranged so as to extend along the edge of the second active region CAA without crossing a central portion of the second active region CAA and thus, reduction of transmittance by the second stem electrode 481 may be minimized.

Further, a section of the second stem electrode 481, and more particularly, a section extending in the same direction as the direction in which the second data line 462 extends, may be arranged to overlap the second data line 462 and thus, the reduction of transmittance may be minimized. In the present exemplary embodiment, a section of the second stem electrode 481 extending in the second direction DR2 may be arranged to overlap the second data line 462 and thus, the reduction of transmittance by the second stem electrode 481 may be minimized.

The plurality of second branch electrodes 482 may respectively extend in directions of inclination of both the first direction DR1 and the second direction DR2 from the second stem electrode 481, that is, in directions which are not all parallel to the first direction DR1 and the second direction DR2.

The respective second branch electrodes 482 may extend in the same direction as the first branch electrodes 182 of the first display panel 10. Here, that the second branch electrodes 482 extend in the same direction may mean that the first branch electrodes 182 described above extend in that direction. In other words, the second pixels CPX may have one domain due to an extending direction of the second branch electrodes 482. Accordingly, transmittance of the second pixels CPX, and further, transmittance of the second display panel 20, may be improved.

However, the second branch electrodes 482 may extend in a direction different from that of the first branch electrodes 182.

In the present exemplary embodiment, while the first branch electrodes 182 have a structure extending in the direction toward the lower right end, as illustrated in FIG. 2, the second branch electrodes 482 may have a structure extending in a direction toward a lower left end, as illustrated in FIG. 3. That is, the extending direction of the first branch electrodes 182 and the extending direction of the second branch electrodes 482 may intersect each other. Further, a direction of a domain of the second pixel CPX determined by the extending direction of the second branch electrodes 482 may be a direction toward an upper right end in the view of FIG. 3.

In the present exemplary embodiment, the extending direction of the first branch electrodes 182 and the extending direction of the second branch electrodes 482 may be perpendicular to each other.

As described above, when the extending directions of the first branch electrodes 182 and the second branch electrodes 482 intersect each other, that is, when directions of domains of the first pixels SPX and the second pixels CPX intersect each other, a brightness deviation according to a viewing direction of the LCD 1000 may be minimized.

More particularly, when all of the first liquid crystals SLC included in the first liquid crystal layer 200 and the second liquid crystals CLC included in the second liquid crystal layer 500 are controlled so as to be inclined in one direction, the transmittance level is slightly different according to a direction from which the LCD 1000 is viewed, and the brightness deviation according to the viewing direction may be large. In other words, when the directions of the domains of the first pixels SPX and the second pixels CPX are the same, the brightness deviation according to the viewing direction of the LCD 1000 may not be acceptable. This is because paths of light passing through the first liquid crystals SLC and the second liquid crystals CLC are different according to the direction from which the LCD 1000 is viewed.

However, as described in the present exemplary embodiment, when the first liquid crystals SLC included in the first liquid crystal layer 200 and the second liquid crystals CLC included in the second liquid crystal layer 500 are controlled so as to be inclined in a direction in which the first liquid crystals SLC and the second liquid crystals CLC intersect each other, the brightness deviation according to the viewing direction of the LCD 1000 may be minimized. This is because, in the structure according to the present exemplary embodiment, light may be provided through various paths even when the direction from which the LCD 1000 is viewed is changed.

As a result, in the LCD 1000 according to the present exemplary embodiment, the contrast ratio may be improved by arranging the first display panel 10 and the second display panel 20 to overlap each other. Further, all of the first pixels SPX arranged on the first display panel 10 and the second pixels CPX arranged on the second display panel 20 have one domain and thus, transmittance may be good even when the first display panel 10 and the second display panel 20 are arranged to overlap each other. Further, the first pixels SPX arranged on the first display panel 10 and the second pixels CPX arranged on the second display panel 20 have different domain directions and thus the brightness deviation according to the viewing direction of the LCD 1000 may be minimized even when the first pixels SPX and the second pixels CPX have one domain.

The second extension electrode 483 is arranged to protrude toward an outside of the second active region CAA. The second extension electrode 483 may be connected to the second stem electrode 481 or the second branch electrodes 482 and formed to overlap the second contact hole CCNT. The second extension electrode 483 may be physically connected to the second drain electrode 466 through the second contact hole CCNT and may receive the second data voltage. The second data voltage provided to the second extension electrode 483 may be transmitted to the second stem electrode 481 and the second branch electrodes 482 through the second extension electrode 483.

Hereinafter, the fourth display substrate 600 will be described.

The fourth display substrate 600 includes a fourth base substrate 610, a second light shielding member 620, a color filter layer 630, a second overcoating layer 640, and a second common electrode 650. That is, unlike the second display substrate 300, the fourth display substrate 600 further includes the color filter layer 630.

The fourth base substrate 610 is arranged opposite the third base substrate 410.

The second light shielding member 620 is arranged on one surface of the fourth base substrate 610 facing the third display substrate 400.

The color filter layer 630 is arranged on one surface of the second light shielding member 620 facing the third display substrate 400. The color filter layer 630 may be made of a photosensitive organic composition containing a pigment for realizing color, and may include at least one among red, green, and blue pigments. For example, the color filter layer 630 may include a plurality of red color filters, green color filters, and blue color filters. However, the inventive concepts are not limited thereto, and the color filter layer 630 may include a cyan color filter, a magenta color filter, and a yellow color filter. Alternatively, a transparent filter which permits passage of all wavelengths of visible light may be arranged instead of the color filter.

The above-described color filter may be arranged to correspond to each of the second pixels CPX. That is, two adjacent second pixels CPX may have different colors and may realize different colors.

Meanwhile, unlike the first display panel 10, the second display panel 20 further includes the color filter layer 630 and thus, the transmittance level of the second display panel 20 may be relatively lower than that of the first display panel 10.

The second overcoating layer 640 is arranged on one surface of the color filter layer 630 facing the third display substrate 400.

The second common electrode 650 is arranged on one surface of the second overcoating layer 640 facing the third display substrate 400.

The second liquid crystal layer 500 is arranged between the third display substrate 400 and the fourth display substrate 600. The second liquid crystal layer 500 includes the second liquid crystals CLC. The second liquid crystals CLC and the first liquid crystal SLC may be made of the same material, and may be arranged in different positions.

The third display substrate 400, the second liquid crystal layer 500, and the fourth display substrate 600, which are described above, may constitute the second display panel 20.

Hereinafter, effects of improving the transmittance and minimizing the brightness deviation according to the viewing direction of the LCD according to an exemplary embodiment will be described.

Figure 5:
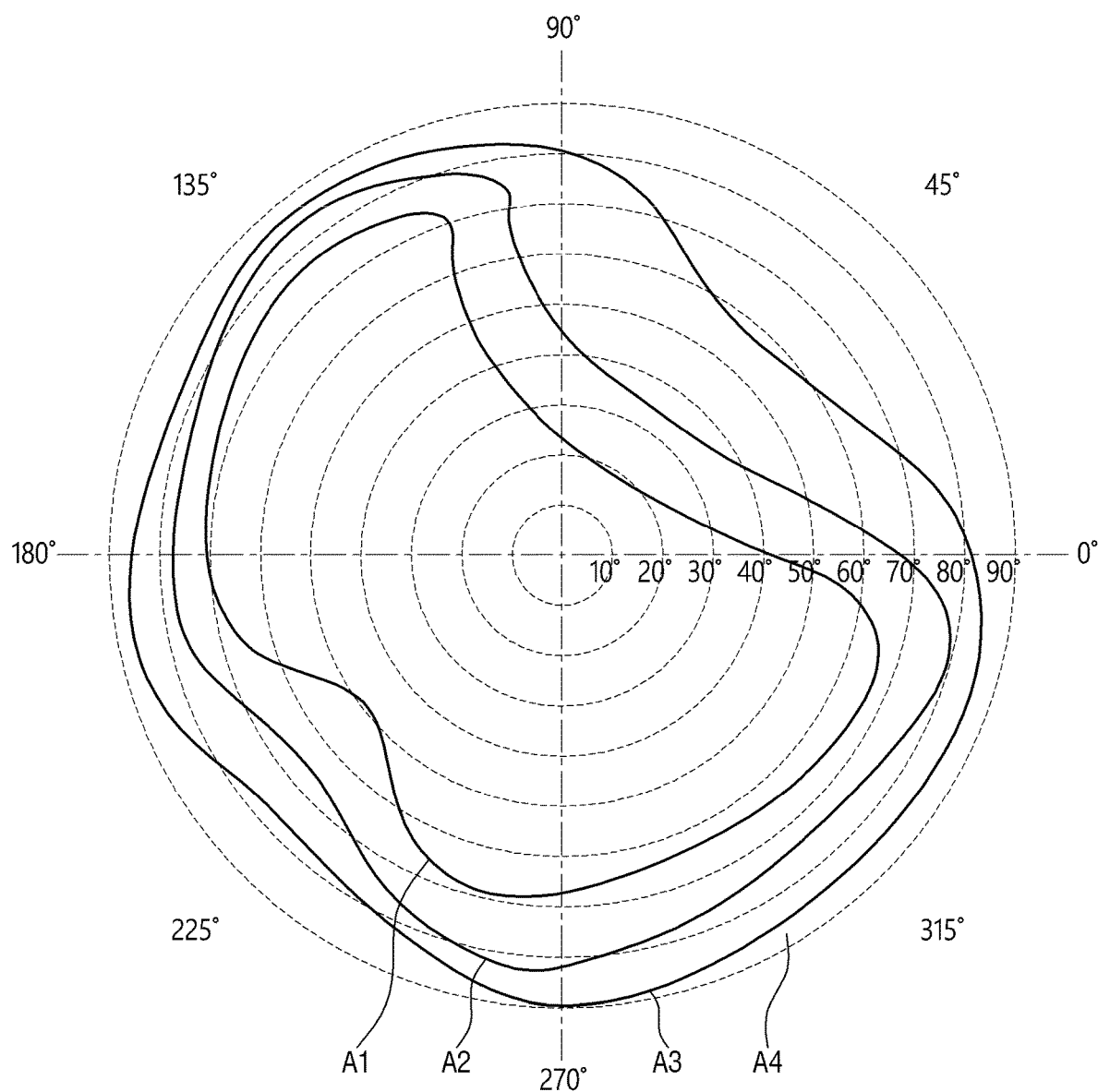
FIG. 5 is a graph illustrating brightness at each viewing position of a first display panel of the LCD according to the exemplary embodiment illustrated in FIGS. 1 to 4.

FIG. 5 is a graph illustrating brightness at each viewing position of the first display panel of the LCD according to the exemplary embodiment illustrated in FIGS. 1 to 4, FIG. 6 is a graph illustrating brightness at each viewing position of the second display panel of the LCD according to the exemplary embodiment illustrated in FIGS. 1 to 4, FIG. 7 is a graph illustrating brightness at each viewing position of the LCD according to the exemplary embodiment illustrated in FIGS. 1 to 4, and FIG. 8 is a graph illustrating brightness at each viewing position of an LCD according to a comparative example.

Figure 8:
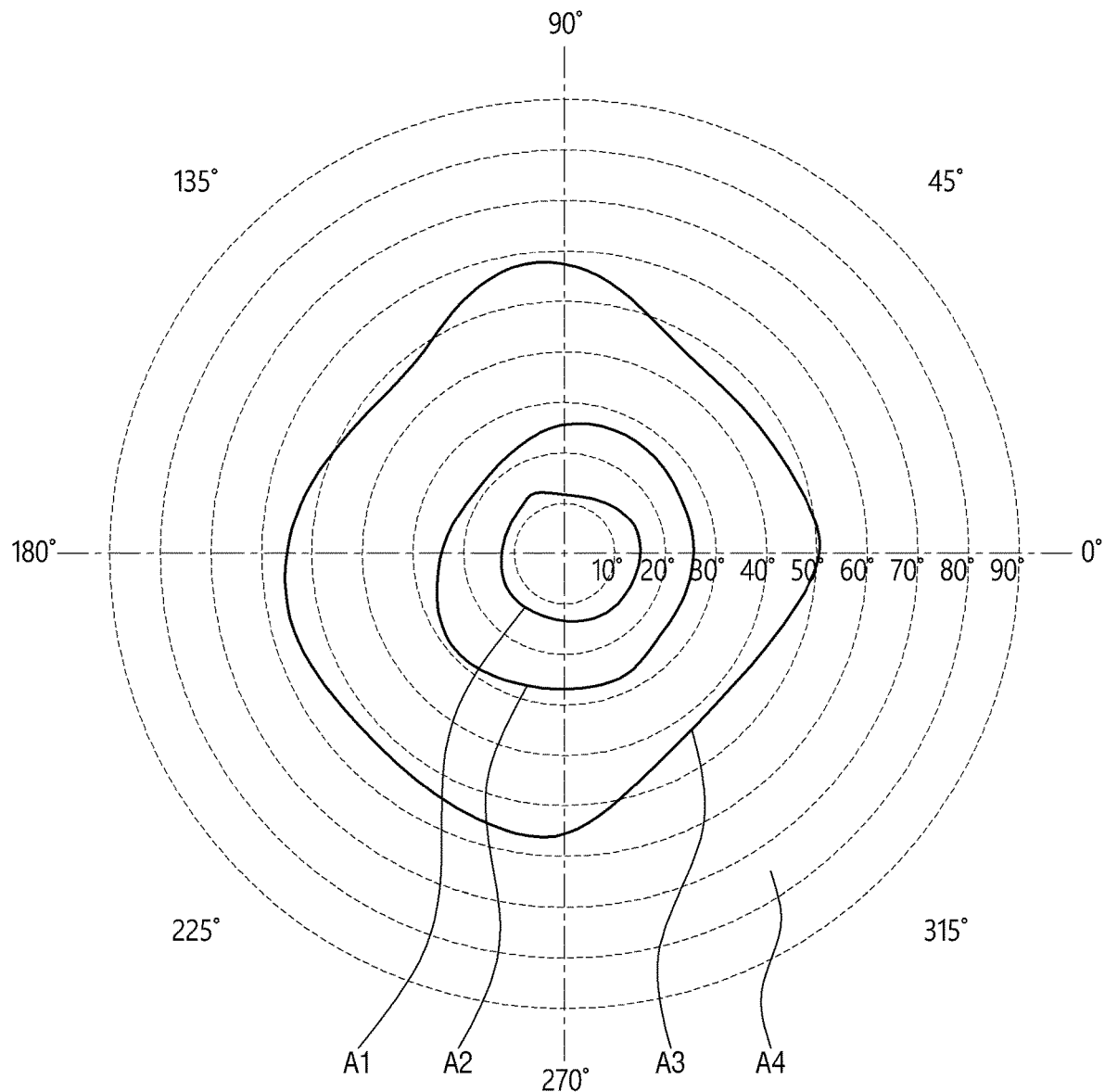
FIG. 8 is a graph illustrating brightness at each viewing position of an LCD according to a comparative example.

In the comparative example of FIG. 8, the LCD has a structure in which the first display panel 10 among the components of the LCD according to the exemplary embodiment illustrated in FIGS. 1 to 4 is omitted and each of the second pixels CPX arranged on the second display panel 20 includes four domains.

In the graphs of FIGS. 5 to 8, angles of 0 to 360 degrees indicated along an outside of an outermost circle indicated by a dotted line refer to viewing directions of the user with respect to the LCD, and angles of 0 to 90 degrees corresponding to respective circles indicated by dotted lines refer to viewing angles of the user with respect to the LCD. Further, in the graphs of FIGS. 5 to 8, when it is assumed a maximum value of observed brightness is 100%, a first region A1 refers to a region viewed at brightness of 75% to 100%, a second region A2 refers to a region viewed at brightness of 50% to 75%, a third region A3 refers to a region viewed at brightness of 25% to 50%, and a fourth region A4 refers to a region viewed at brightness of 0% to 25%.

First, referring to FIG. 5, it can be seen that the first region A1 is distributed over a very large area, and has the best transmittance. This is because the first pixels SPX arranged on the first display panel 10 include only one domain, the color filter layer 630 is not arranged on the first display panel 10, unlike the second display panel 20, and the first display panel 10 corresponds to a panel which only serves as a shutter.

However, because the first pixels SPX arranged on the first display panel 10 have one domain, the first to third regions A1, A2, and A3 have a shape widely distributed toward an upper left end and a lower right end in the view of FIG. 5, and brightness deviations of the first to third regions A1, A2, and A3 are significantly large according to the viewing direction.

Figure 6:
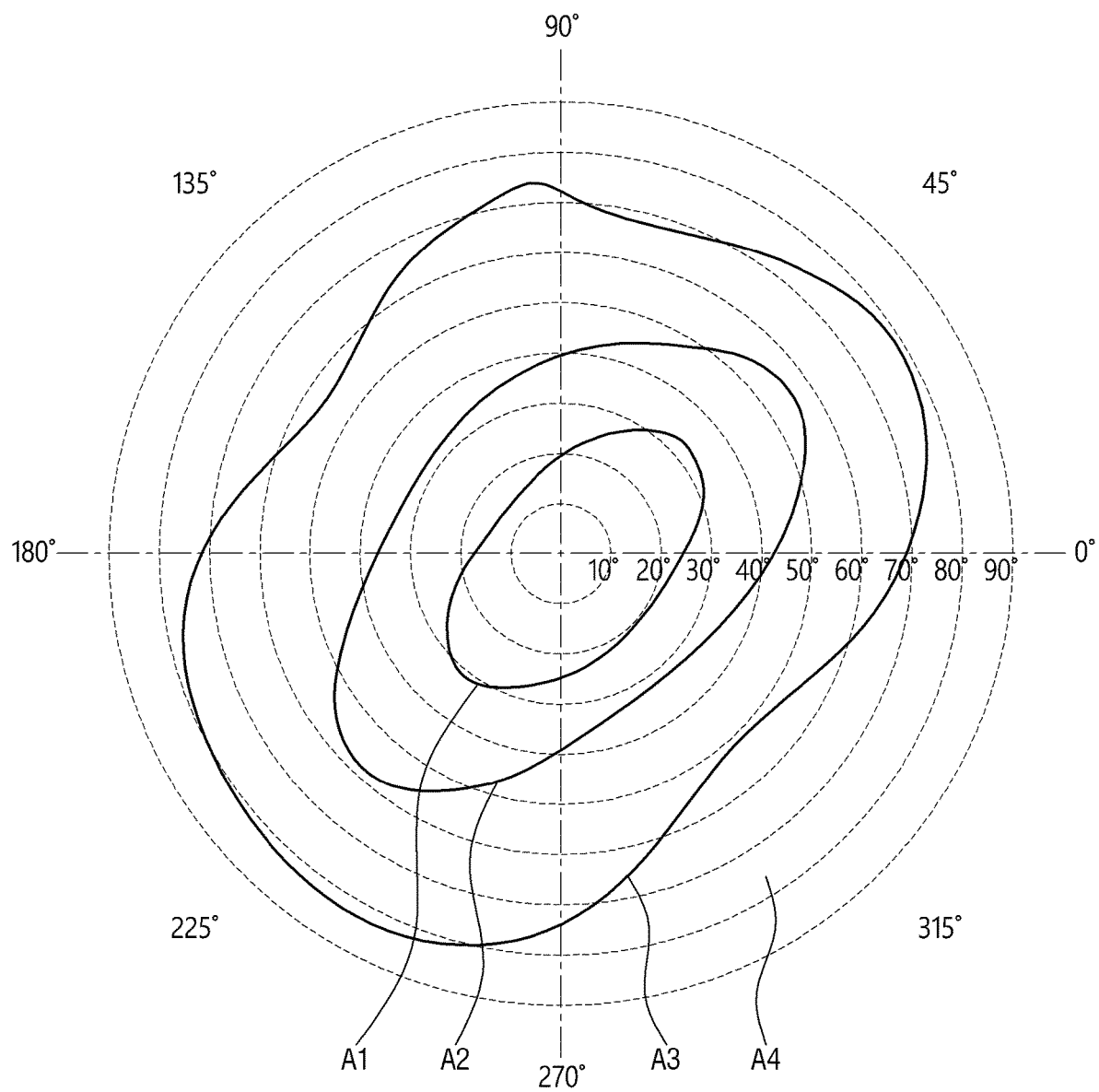
FIG. 6 is a graph illustrating brightness at each viewing position of a second display panel of the LCD according to the exemplary embodiment illustrated in FIGS. 1 to 4.

Next, referring to FIG. 6, it can be seen that a first region A1 illustrated in FIG. 6 is distributed over a larger area than a first region A1 illustrated in FIG. 8 even when the first region A1 illustrated in FIG. 6 is slightly smaller than a first region A1 illustrated in FIG. 5. Accordingly, the transmittance is good in comparison to the comparative example. This is because the second pixels CPX arranged on the second display panel 20 include only one domain.

However, because the second pixels CPX arranged on the second display panel 20 have one domain, the first to third regions A1, A2, and A3 have a shape widely distributed toward an upper right end and a lower left end in the view of FIG. 6, and brightness deviations are significantly large according to the viewing directions.

Figure 7:
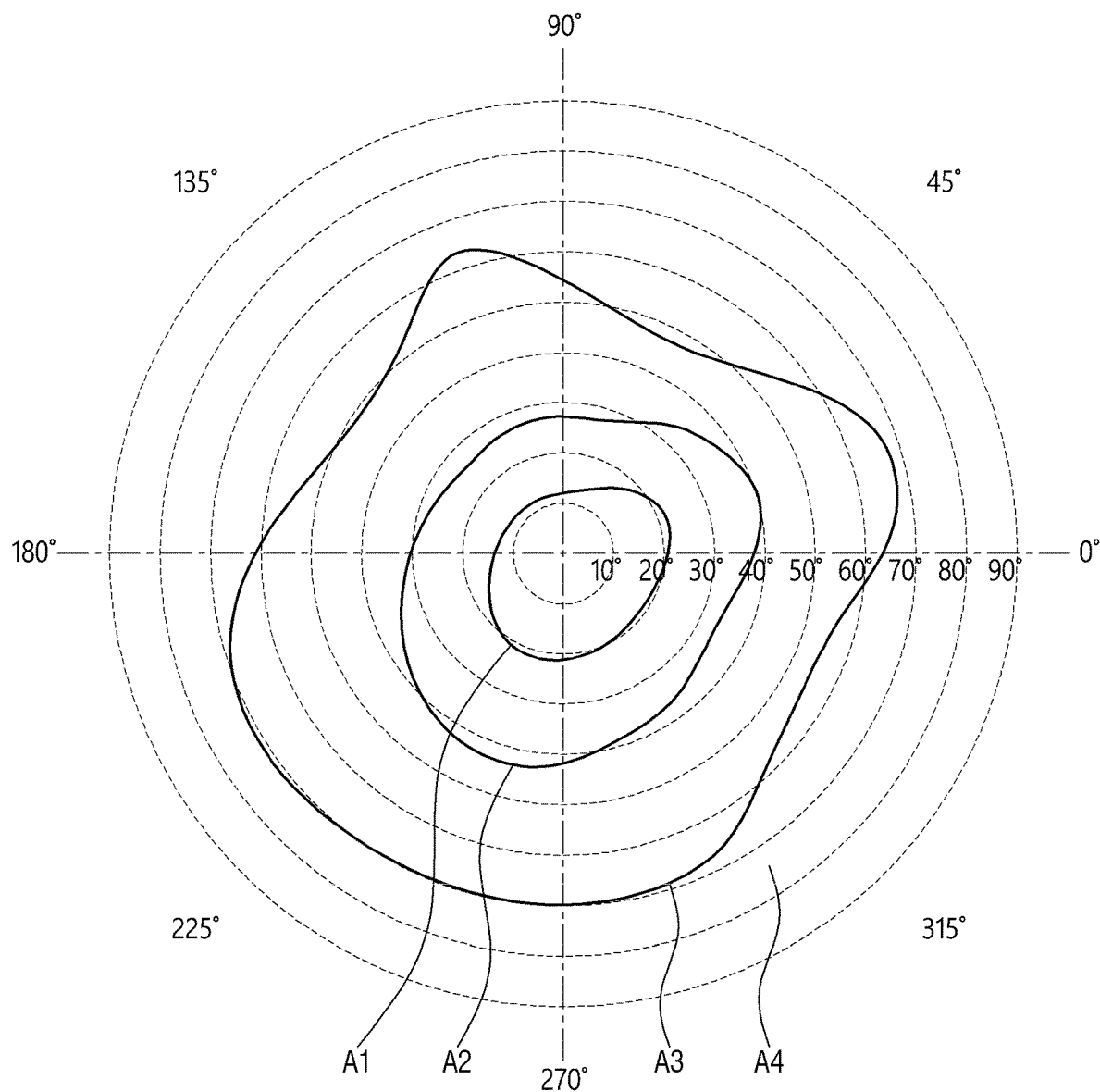
FIG. 7 is a graph illustrating brightness at each viewing position of the LCD according to the exemplary embodiment illustrated in FIGS. 1 to 4.

Next, referring to FIG. 7, it can be seen that a first region A1 illustrated in FIG. 7 is distributed over a larger area than the first region A1 illustrated in FIG. 8 and has a shape approximating a circle. That is, it can be seen that the transmittance is good in comparison to the comparative example. This is because all of the first pixels SPX and the second pixels CPX respectively arranged on the first display panel 10 and the second display panel 20 constituting the LCD 1000 include only one domain.

At the same time, the domain directions of the first pixels SPX and the second pixels CPX intersect each other, and thus all of the first to third regions A1, A2, and A3 have a shape approximating a circle. Accordingly, it can be seen that the brightness deviation according to the viewing direction is minimized in the LCD 1000 according to the present exemplary embodiment.

Figure 9:
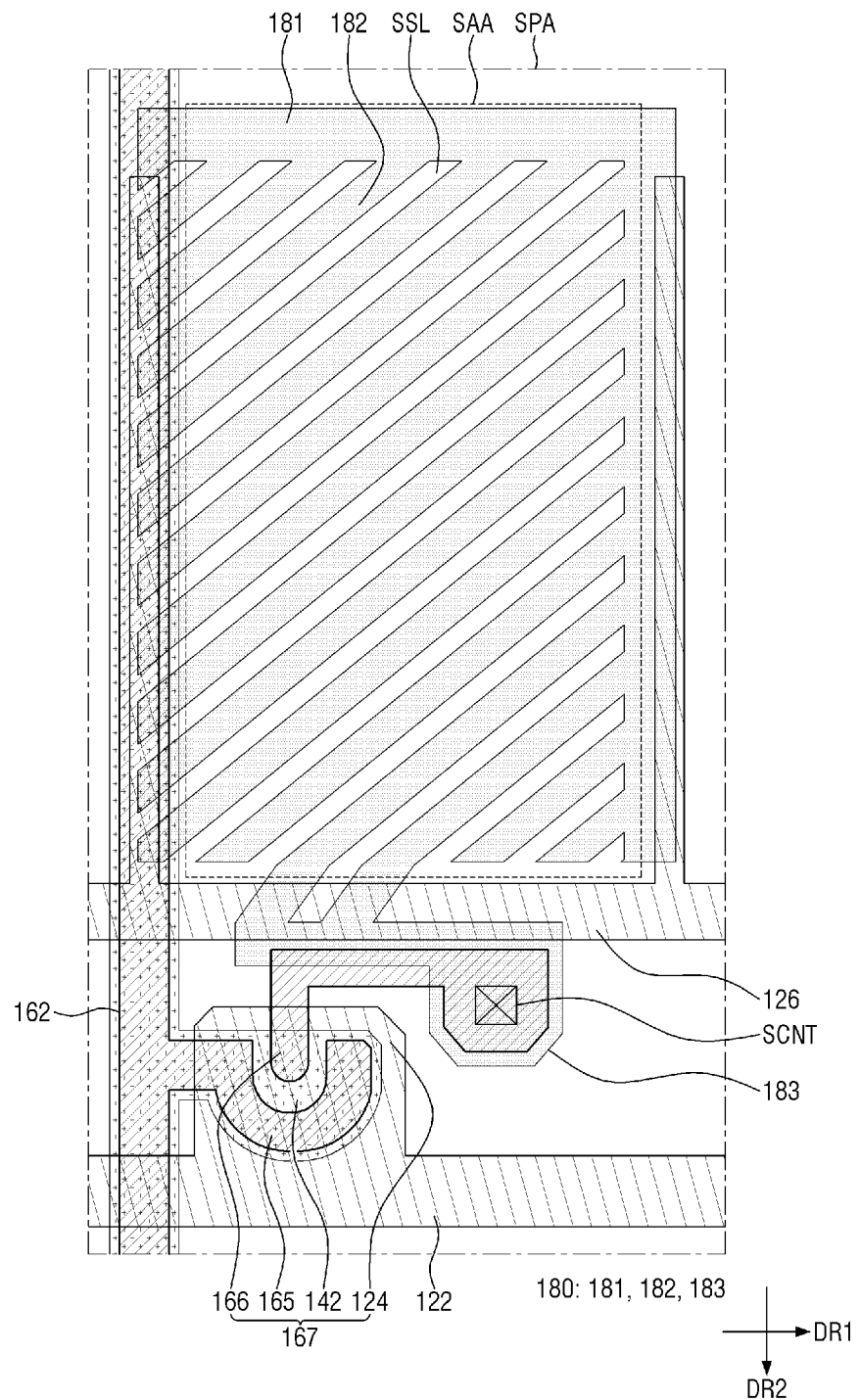
FIG. 9 is a schematic layout diagram of a first pixel of an LCD according to another exemplary embodiment.
Figure 10:
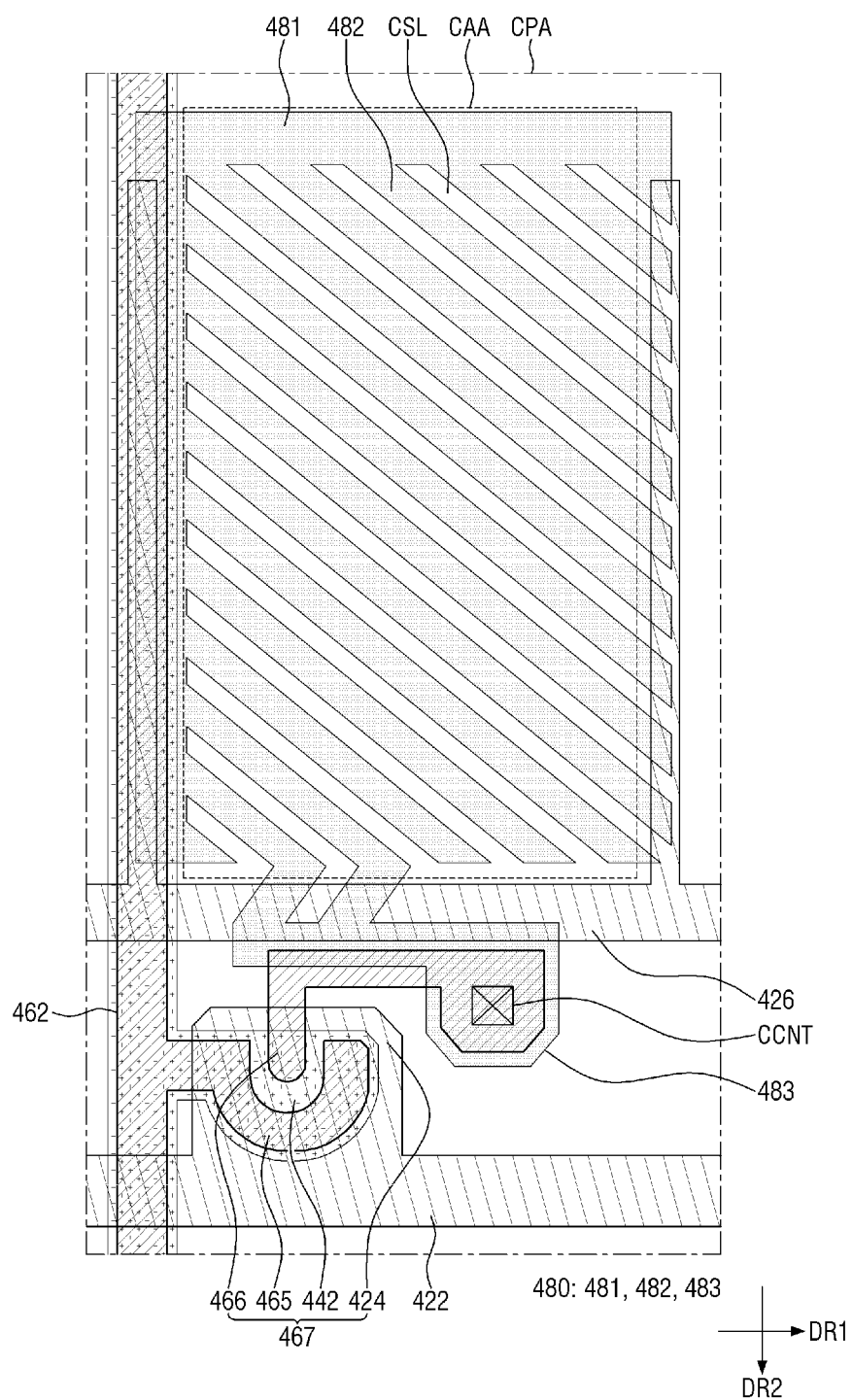
FIG. 10 is a schematic layout diagram of a second pixel of the LCD according to the exemplary embodiment illustrated in FIG. 9.

FIG. 9 is a schematic layout diagram of a first pixel of an LCD according to another exemplary embodiment, and FIG. 10 is a schematic layout diagram of a second pixel of the LCD according to the exemplary embodiment illustrated in FIG. 9.

Hereinafter in the drawings, out of descriptions overlapping those of the configurations and reference numerals in FIGS. 1 to 4, descriptions of different characteristics will be mainly given, and a description of identical characteristics will be omitted or simplified.

Referring to FIGS. 9 and 10, a first pixel SPX of an LCD 1000 according to the present exemplary embodiment includes first branch electrodes 182 extending toward a lower left end in the view of FIG. 9. Accordingly, the first pixel SPX of the LCD 1000 according to the present exemplary embodiment has a domain direction toward an upper right end.

On the other hand, a second pixel CPX of the LCD 1000 according to the present exemplary embodiment includes second branch electrodes 482 extending toward a lower right end in the view of FIG. 10. Accordingly, the second pixel CPX of the LCD 1000 according to the present exemplary embodiment has a domain direction toward an upper left end.

That is, the LCD 1000 according to the present exemplary embodiment is different from the LCD 1000 according to the exemplary embodiment illustrated in FIGS. 1 to 4 in that the domain directions of the first pixel SPX and the second pixel CPX are different from each other. However, the domain directions of the first pixel SPX and the second pixel CPX of the LCD 1000 according to the present exemplary embodiment are arranged to intersect each other at right angles and thus, the LCD 1000 according to the present exemplary embodiment may have an excellent contrast ratio and a good transmittance level, and may minimize a brightness deviation according to the viewing direction, similar to the LCD 1000 according to the exemplary embodiment illustrated in FIGS. 1 to 4.

Figure 11:
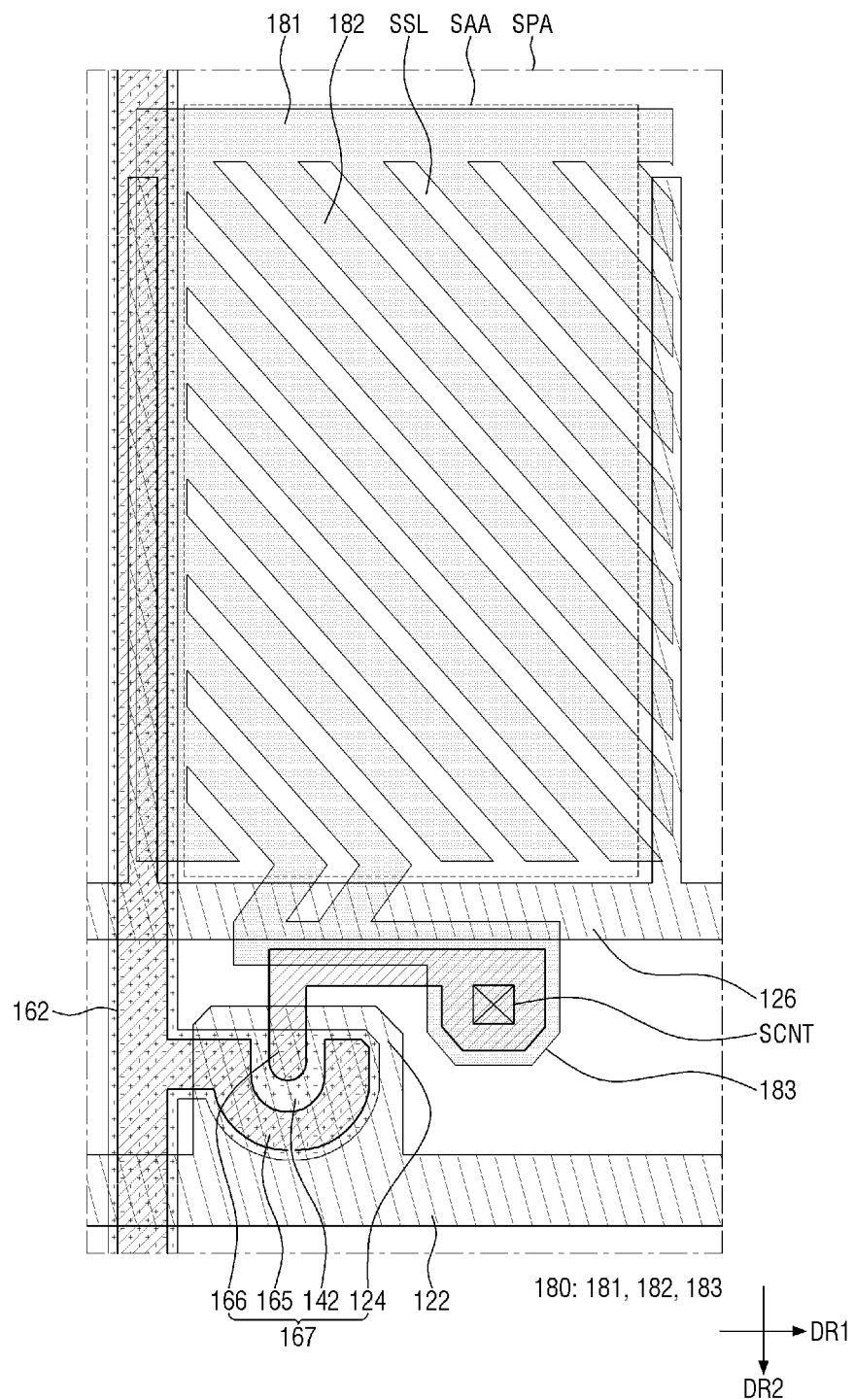
FIG. 11 is a schematic layout diagram of a first pixel of an LCD according to still another exemplary embodiment.
Figure 12:
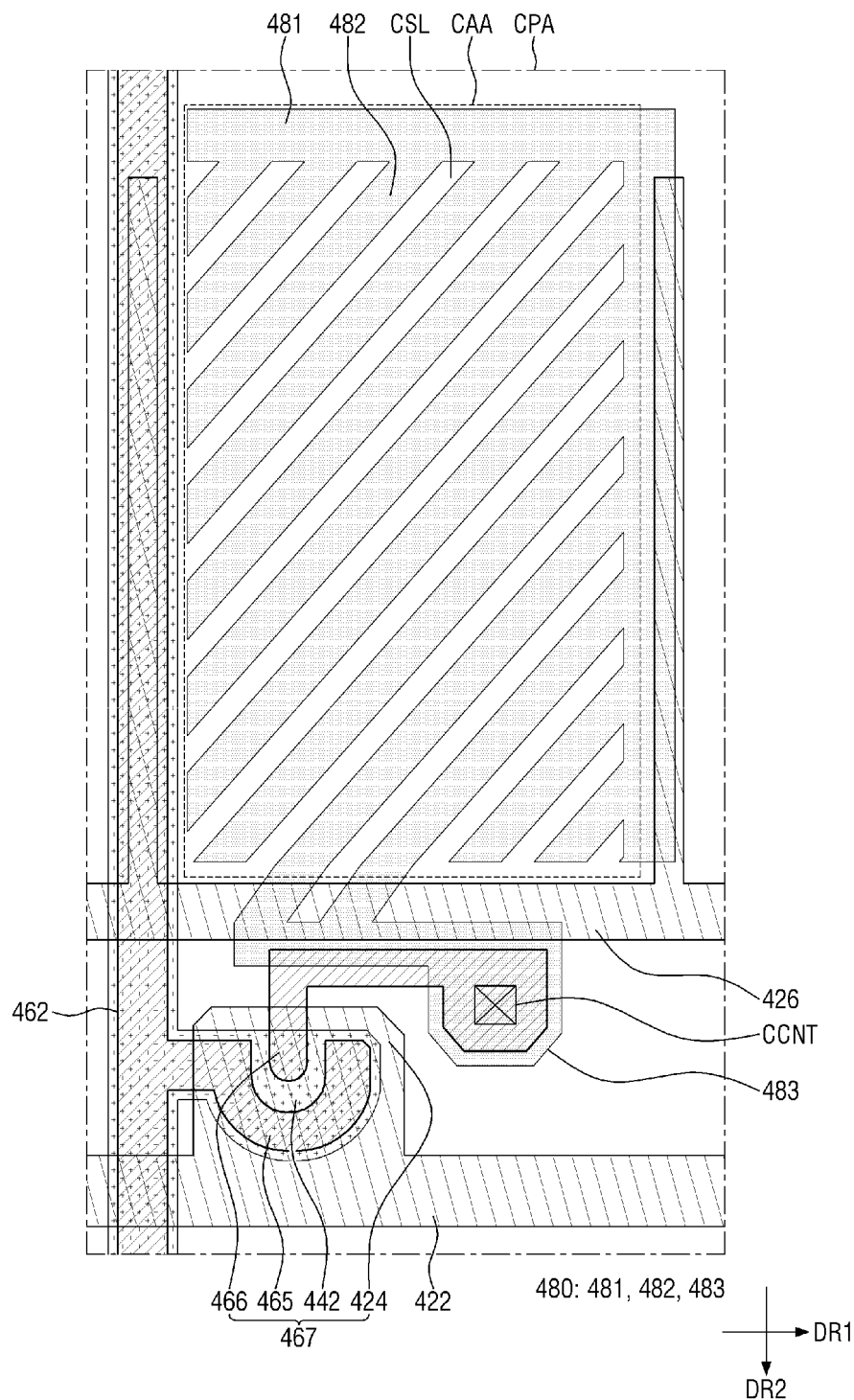
FIG. 12 is a schematic layout diagram of a second pixel of the LCD according to the exemplary embodiment illustrated in FIG. 11.
Figure 13:
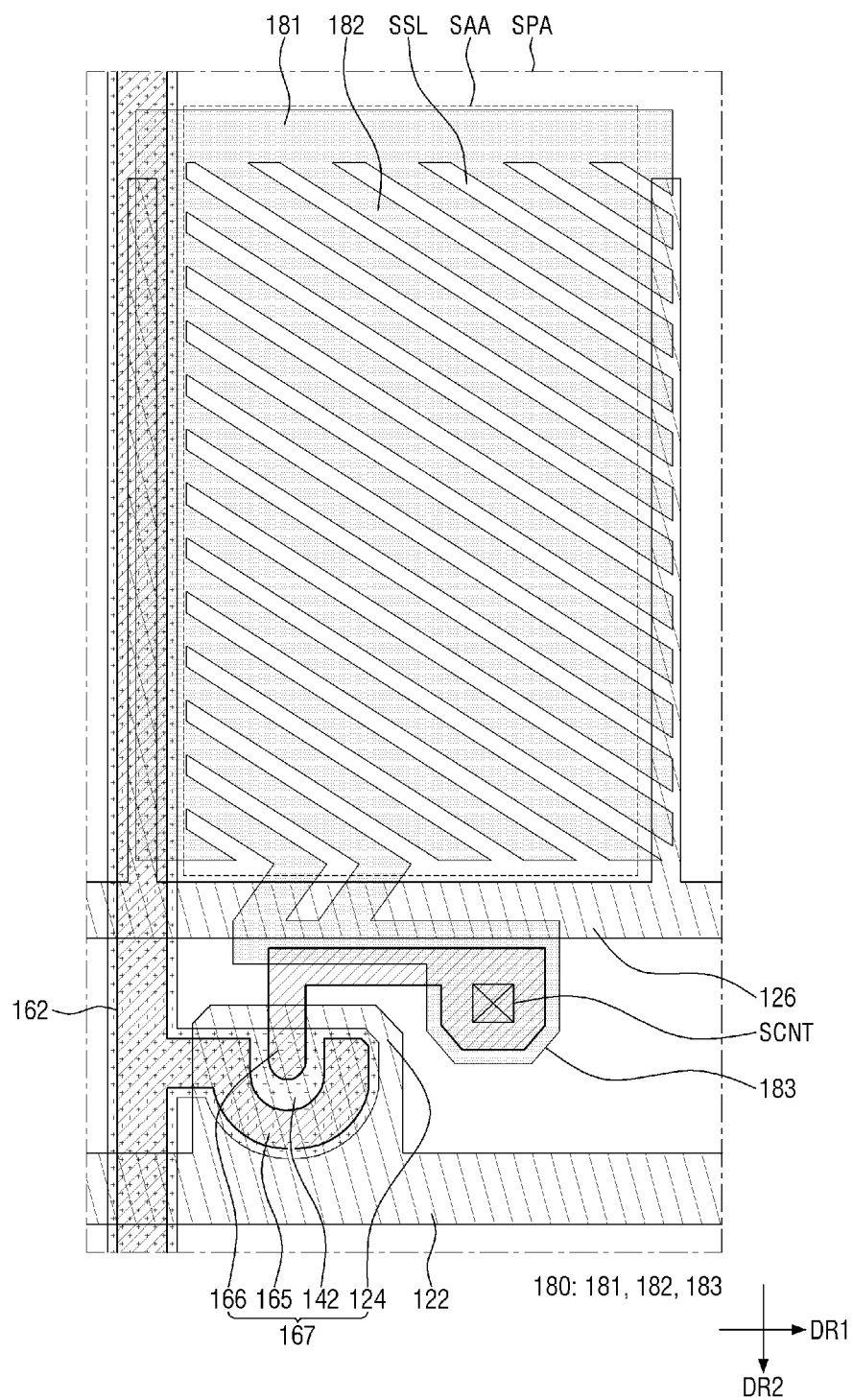
FIG. 13 is a schematic layout diagram of a first pixel of an LCD according to yet another exemplary embodiment.
Figure 14:
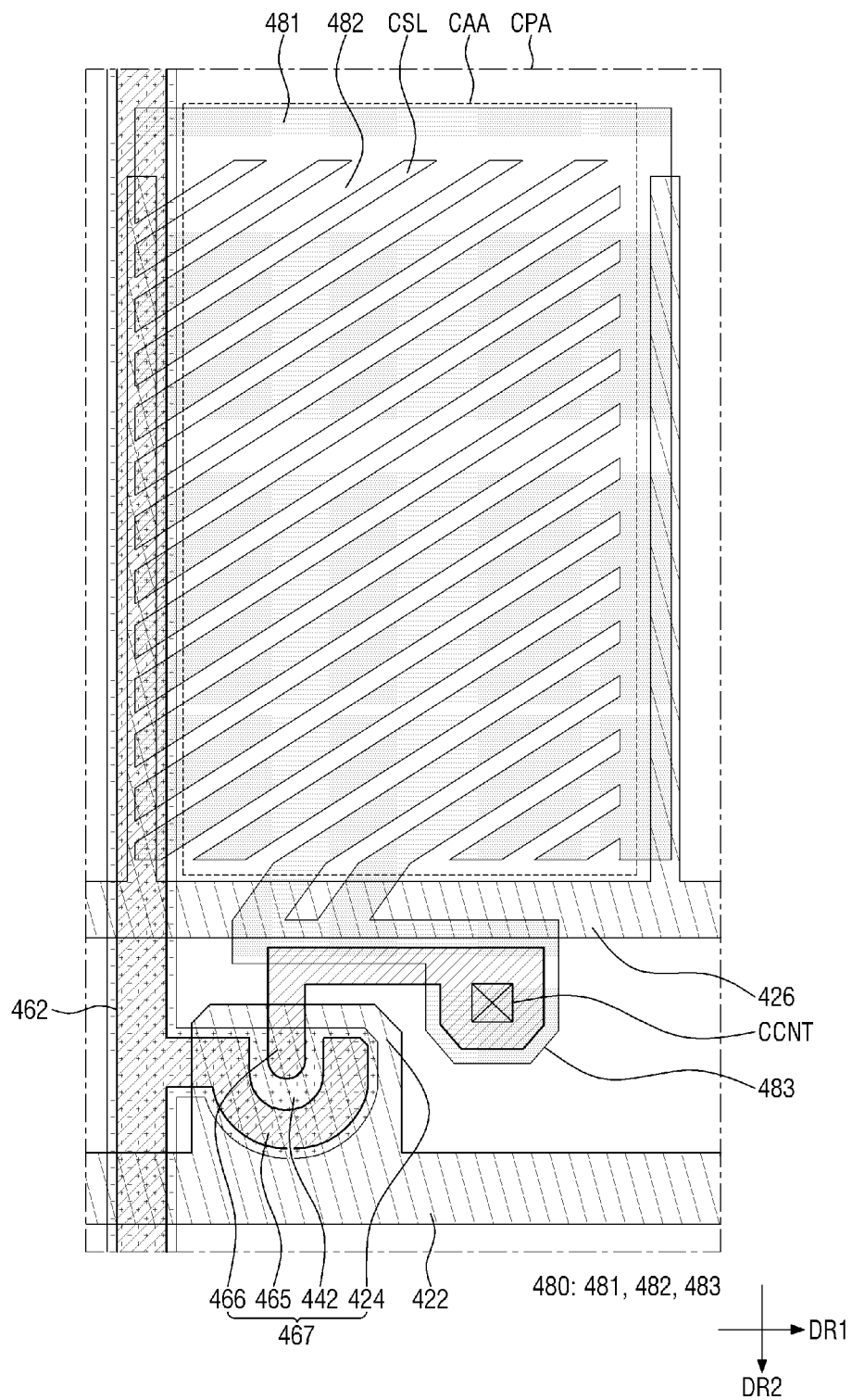
FIG. 14 is a schematic layout diagram of a second pixel of the LCD according to the exemplary embodiment illustrated in FIG. 13.

FIG. 11 is a schematic layout diagram of a first pixel of an LCD according to still another exemplary embodiment, FIG. 12 is a schematic layout diagram of a second pixel of the LCD according to the exemplary embodiment illustrated in FIG. 11, FIG. 13 is a schematic layout diagram of a first pixel of an LCD according to yet another exemplary embodiment, and FIG. 14 is a schematic layout diagram of a second pixel of the LCD according to the exemplary embodiment illustrated in FIG. 13.

Hereinafter in the drawings, out of descriptions overlapping those of the configurations and reference numerals in FIGS. 1 to 4, descriptions of different characteristics will be mainly given, and a description of identical characteristics will be omitted or simplified.

First, referring to FIGS. 11 and 12, a first pixel SPX of an LCD 1000 according to the present exemplary embodiment includes first branch electrodes 182 extending toward a lower right end in the view of FIG. 11. Accordingly, the first pixel SPX of the LCD 1000 according to the present exemplary embodiment has a domain direction toward an upper left end. However, in comparison to the first pixel SPX according to the exemplary embodiment illustrated in FIG. 2, an extending direction of each of the first branch electrodes 182 may be relatively closer to the second direction DR2.

On the other hand, a second pixel CPX of the LCD 1000 according to the present exemplary embodiment includes second branch electrodes 482 extending toward a lower left end in the view of FIG. 12. Accordingly, the second pixel CPX of the LCD 1000 according to the present exemplary embodiment has a domain direction toward an upper right end. However, in comparison to the second pixel CPX according to the exemplary embodiment illustrated in FIG. 3, an extending direction of each of the second branch electrodes 482 may be relatively closer to the second direction DR2.

That is, the LCD 1000 according to the present embodiment is different from the LCD 1000 according to the exemplary embodiment illustrated in FIGS. 1 to 4 in that both of domain directions of the first pixel SPX and the second pixel CPX are relatively close to the second direction DR2. In this case, when the LCD 1000 is mainly used for being viewed from a specific direction, it can be recognized as visually as brighter. For example, when the LCD 1000 is used as an instrument panel of an automobile, an image may be mainly viewed at an upper side of the LCD 1000 so that more advantageous brightness characteristics may be secured. On the other hand, when the LCD 1000 is used as a home television, an image is mainly viewed at right and left sides rather than upper and lower sides so that more advantageous brightness characteristics may be secured.

In the same manner, referring to FIGS. 13 and 14, domain directions of the first pixel SPX and the second pixel CPX of the LCD 1000 according to the present exemplary embodiment may be relatively closer to the first direction DR1 in comparison to the first pixel SPX and the second pixel CPX of the LCD according to the exemplary embodiment illustrated in FIGS. 1 to 4. Accordingly, when the LCD 1000 is mainly used for being viewed from a specific direction, it can be visually recognized as brighter.

Figure 15:
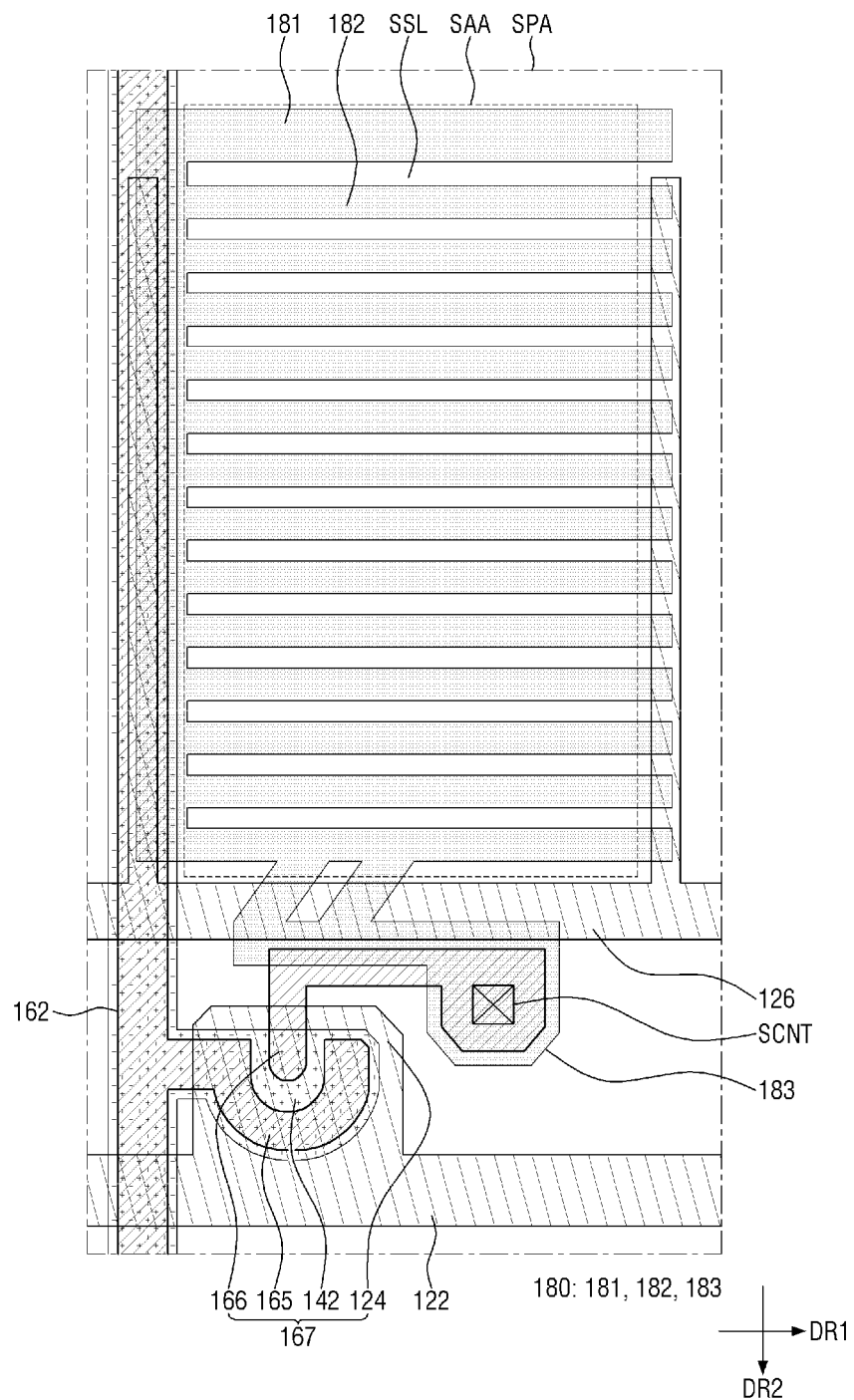
FIG. 15 is a schematic layout diagram of a first pixel of an LCD according to yet another exemplary embodiment.
Figure 16:
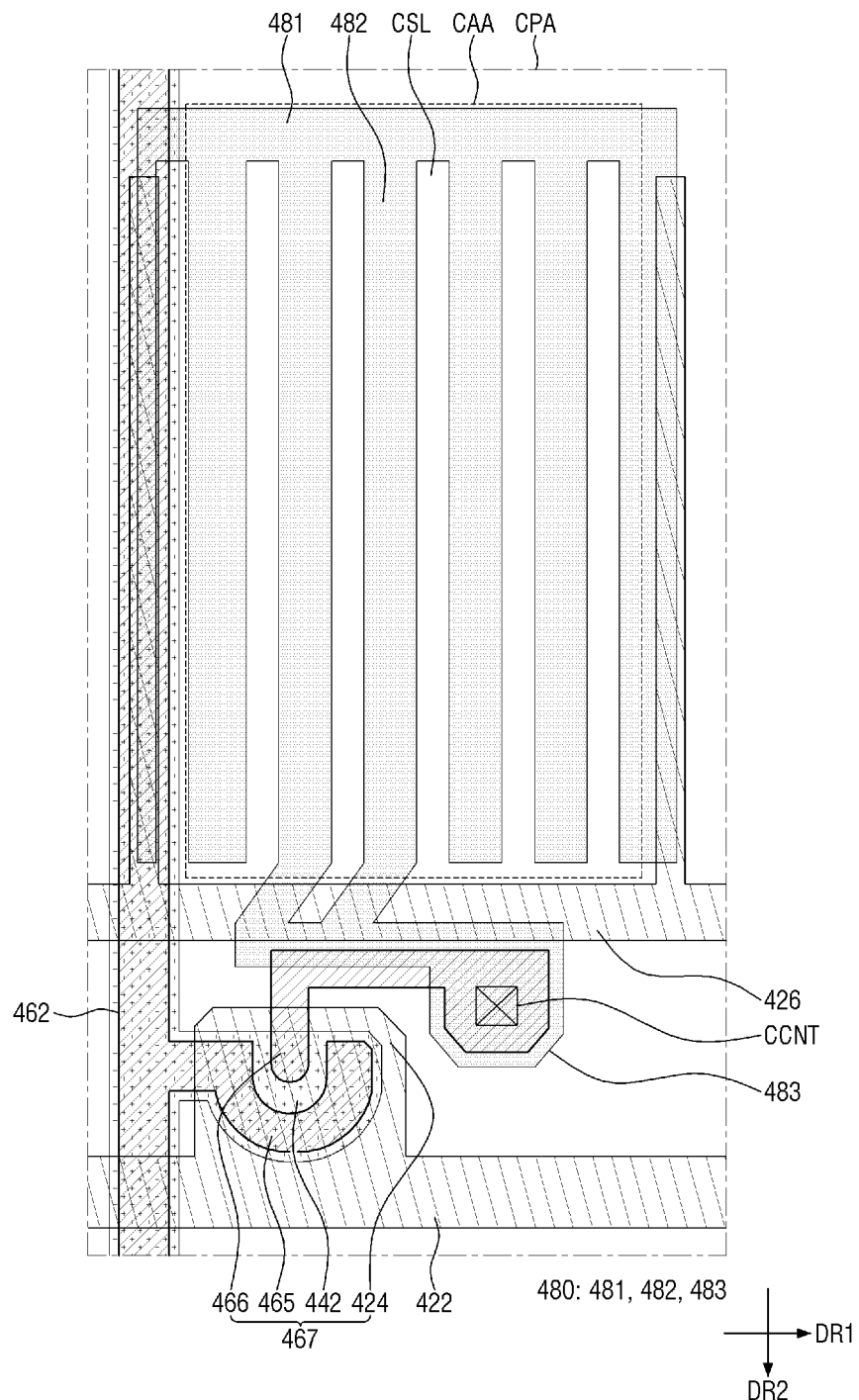
FIG. 16 is a schematic layout diagram of a second pixel of the LCD according to the exemplary embodiment illustrated in FIG. 15.

FIG. 15 is a schematic layout diagram of a first pixel of an LCD according to yet another exemplary embodiment, and FIG. 16 is a schematic layout diagram of a second pixel of the LCD according to the exemplary embodiment illustrated in FIG. 15.

Hereinafter in the drawings, out of descriptions overlapping those of the configurations and reference numerals in FIGS. 1 to 4, descriptions of different characteristics will be mainly given, and a description of identical characteristics will be omitted or simplified.

Referring to FIGS. 15 and 16, a first pixel SPX of an LCD 1000 according to the present exemplary embodiment includes first branch electrodes 182 extending toward a right side in the view of FIG. 15. In other words, the first branch electrodes 182 of the first pixel SPX may extend in a first direction DR1. Accordingly, the first pixel SPX of the LCD 1000 according to the present exemplary embodiment has a domain direction toward a left side.

On the other hand, a second pixel CPX of the LCD 1000 according to the present embodiment includes second branch electrodes 482 extending toward a lower end in the view of FIG. 16. In other words, the second branch electrodes 482 of the second pixel CPX may extend in a second direction DR2. Accordingly, the second pixel CPX of the LCD 1000 according to the present exemplary embodiment has a domain direction toward an upper end.

That is, the LCD 1000 according to the present exemplary embodiment is different from the LCD 1000 according to the exemplary embodiment illustrated in FIGS. 1 to 4 in that the domain directions of the first pixel SPX and the second pixel CPX are respectively the same as the first direction DR1 or the second direction DR2. However, the domain directions of the first pixel SPX and the second pixel CPX of the LCD 1000 according to the present exemplary embodiment are arranged to intersect each other at right angles, and thus the LCD 1000 according to the present exemplary embodiment may have an excellent contrast ratio and good transmittance and may minimize a brightness deviation according to the viewing direction, like the LCD 1000 according to the exemplary embodiment illustrated in FIGS. 1 to 4.

Figure 17:
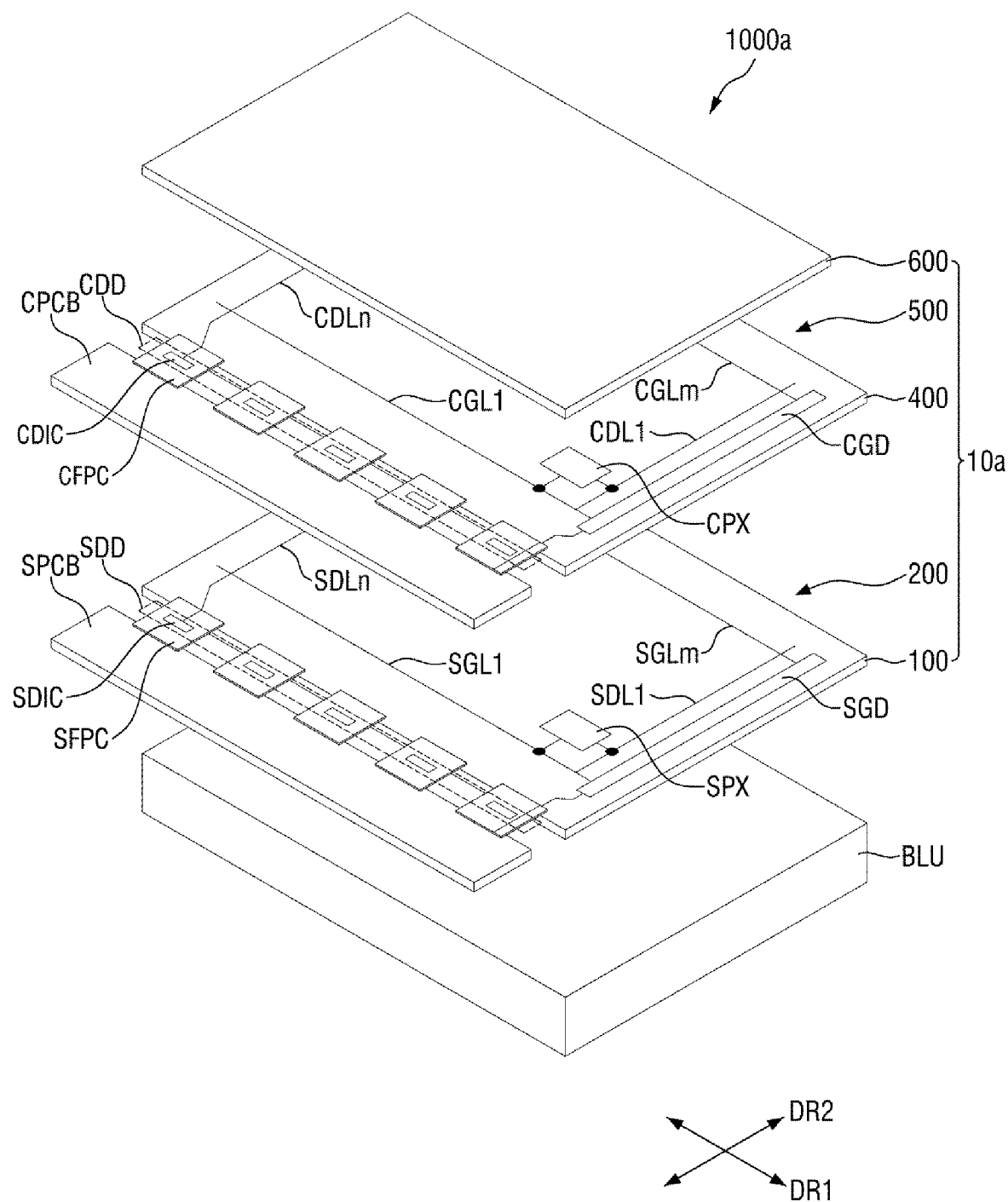
FIG. 17 is a perspective view of an LCD according to yet another exemplary embodiment.

FIG. 17 is a perspective view of an LCD according to yet another exemplary embodiment.

Hereinafter in the drawing, out of descriptions overlapping those of the configurations and reference numerals in FIGS. 1 to 4, descriptions of different characteristics will be mainly given, and a description of identical characteristics will be omitted or simplified.

Referring to FIG. 17, an LCD 1000a according to the present exemplary embodiment includes only three display substrates. More particularly, the LCD 1000a according to the present exemplary embodiment includes a first display substrate 100, a third display substrate 400, and a fourth display substrate 600, and further includes a first liquid crystal layer 200 arranged between the first display substrate 100 and the third display substrate 400 and a second liquid crystal layer 500 arranged between the third display substrate 400 and the fourth display substrate 600.

Unlike the LCD 1000 according to the exemplary embodiment illustrated in FIGS. 1 to 4, the LCD 1000a according to the present exemplary embodiment may have a structure in which one substrate, that is, the third display substrate 400, is arranged between the first liquid crystal layer 200 and the second liquid crystal layer 500 and the second display substrate 300 (in FIG. 1) is omitted. Accordingly, unlike the LCD 1000 illustrated in FIGS. 1 to 4, which is configured with two panels including the first display panel 10 (in FIG. 1) and the second display panel 20 (in FIG. 1), the LCD 1000a according to the present exemplary embodiment may include only one display panel 10a including the first display substrate 100, the third display substrate 400, and the fourth display substrate 600.

Instead, the third display substrate 400 of the LCD 1000a according to the present exemplary embodiment may have a structure in which the components arranged on the second display substrate 300 (in FIG. 1) of the LCD 1000 according to the exemplary embodiment illustrated in FIGS. 1 to 4 are arranged on one surface facing the first display substrate 100.

Further, in the LCD 1000a according to the present exemplary embodiment, a polarization layer arranged between the first liquid crystal layer 200 and the second liquid crystal layer 500 may have a wire grid structure and may be integrally formed with the display panel 10a.

According to the inventive concepts, an LCD having good transmittance and in which a brightness deviation according to a viewing direction thereof is minimized even when two liquid crystal layers are used can be provided.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A liquid crystal display comprising:
a first substrate on which a plurality of first pixels are defined;
a first pixel electrode arranged for each of the first pixels on the first substrate;
first gate lines and first data lines crossing each other, each of the first pixels being positioned in a first spaced defined by adjacent first gate lines and adjacent first data lines;
a second substrate arranged opposite to the first substrate;
a third substrate arranged on the second substrate and on which a plurality of second pixels are defined;
a second pixel electrode arranged for each of the second pixels on the third substrate;
second gate lines and second data lines crossing each other, each of the second pixels being positioned in a second space defined by adjacent second gate lines and adjacent second data lines; and
a fourth substrate arranged opposite to the third substrate, wherein:
each of the plurality of the second pixels overlaps a different one of the plurality of the first pixels;
each of the first pixels has a first domain and each of the second pixels has a second domain;
a direction of the first domain of the first pixels and a direction of the second domain of the second pixels are different from each other;
the first pixel electrode comprises a first stem electrode and a plurality of first branch electrodes extended from the first stem electrode;
the second pixel electrode comprises a second stem electrode and a plurality of second branch electrodes extended from the second stem electrode;
the first stem electrode include a first portion extending in a direction parallel to the first data lines;
the second stem electrode include a first portion extending in a direction parallel to the second data lines;
the first portion of the first stem electrode overlaps at least a portion of the first data lines; and
the first portion of the second stem electrode does not overlap the second data lines.
2. The liquid crystal display of claim 1, wherein:
the first pixel comprises a first active region configured to allow the transmission of light;
the second pixel comprises a second active region configured to allow the transmission of light;
the first stem electrode further comprises a second portion extending in a direction perpendicular to the first portion of the first stem electrode; and
the second stem electrode further comprises a second portion extending in a direction perpendicular to the first portion of the second stem electrode.
3. The liquid crystal display of claim 2, wherein the first branch electrodes extend in the same direction in a region of 80% or more of the first active region and the second branch electrodes extend in the same direction in a region of 80% or more of the second active region.

4. The liquid crystal display of claim 2, wherein the first branch electrode and the second branch electrode extend in different directions.

5. The liquid crystal display of claim 1, wherein the direction of the first domain of the first pixels and the direction of the second domain of the second pixels are orthogonal to each other.

6. The liquid crystal display of claim 2, wherein the first branch electrode and the second branch electrode are orthogonal to each other.

7. The liquid crystal display of claim 2, wherein the first active region and the second active region are arranged to overlap each other.

8. The liquid crystal display of claim 2, wherein the first data line is arranged to overlap a portion of the first stem electrode, and the second data line is arranged to overlap a portion of the second stem electrode.

9. The liquid crystal display of claim 1, further comprising a color filter layer disposed on the third substrate or the fourth substrate.

10. The liquid crystal display of claim 1, further comprising:
a first polarization layer disposed on the first substrate;
a second polarization layer disposed between second substrate and the third substrate; and
a third polarization layer disposed on the fourth substrate.

11. The liquid crystal display of claim 1, further comprising:
a first liquid crystal layer disposed between the first substrate and the second substrate; and
a second liquid crystal layer disposed between the third substrate and the fourth substrate.

12. A liquid crystal display comprising:
a first substrate on which a plurality of first pixels are defined;
a first pixel electrode arranged for each of the first pixels on the first substrate;
a second substrate arranged on-the first substrate and on which a plurality of second pixels are defined;
a second pixel electrode arranged for each of the second pixels on the second substrate;
a third substrate arranged on the second substrate;
a first liquid crystal layer disposed between the first substrate and the second substrate;
a second liquid crystal layer disposed between the second substrate and the third substrate; and
a single, first polarization layer disposed between the first substrate and the third substrate,
wherein:
each of the first pixels has a first domain and each of the second pixels has a second domain;
a direction of the first domain of the first pixels and a direction of the second domain of the second pixels are different from each other;
each of the plurality of second pixels overlaps a different one of the plurality of first pixels;
the first pixel electrode comprises a first stem electrode and a plurality of first branch electrodes extended from the first stem electrode;
the second pixel electrode comprises a second stem electrode and a plurality of second branch electrodes extended from the second stem electrode;
the first stem electrode include a first portion extending in a direction parallel to the first data lines;
the second stem electrode include a first portion extending in a direction parallel to the second data lines;
the first portion of the first stem electrode overlaps at least a portion of the first data lines; and
the first portion of the second stem electrode does not overlap the second data lines.

13. The liquid crystal display of claim 12, wherein:
the first pixel comprises a first active region configured to allow the transmission of light;
the second pixel comprises a second active region configured to allow the transmission of light;
the first stem electrode further comprises a second portion extending in a direction perpendicular to the first portion of the first stem electrode; and
the second stem electrode further comprises a second portion extending in a direction perpendicular to the first portion of the second stem electrode.

14. The liquid crystal display of claim 13, wherein the first branch electrodes extend in the same direction in a region of 80% or more of the first active region and the second branch electrodes extend in the same direction in a region of 80% or more of the second active region.

15. The liquid crystal display of claim 13, wherein the first branch electrode and the second branch electrode extend in different directions.

16. The liquid crystal display of claim 12, wherein the direction of the first domain of the first pixel and the direction of the second domain of the second pixel are orthogonal to each other.

17. The liquid crystal display of claim 13, wherein the first branch electrode and the second branch electrode are orthogonal to each other.

18. The liquid crystal display of claim 12, further comprising:
a second polarization layer disposed on the first substrate; and
a third polarization layer disposed on the third substrate.

19. The liquid crystal display of claim 18, wherein the first polarization layer has a wire grid structure.

* * * * *